US010858610B2

(12) United States Patent
Lewis

(10) Patent No.: US 10,858,610 B2
(45) Date of Patent: *Dec. 8, 2020

(54) COLD CRANKING SIMULATOR VISCOSITY BOOSTING BASE STOCKS AND LUBRICATING OIL FORMULATIONS CONTAINING THE SAME

(71) Applicant: ExxonMobil Chemical Patents Inc., Baytown, TX (US)

(72) Inventor: Kyle G. Lewis, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/904,703

(22) Filed: Feb. 26, 2018

(65) Prior Publication Data

US 2018/0273874 A1 Sep. 27, 2018

Related U.S. Application Data

(60) Provisional application No. 62/476,024, filed on Mar. 24, 2017.

(51) Int. Cl.
*C10M 171/02* (2006.01)
*C10M 169/04* (2006.01)
(Continued)

(52) U.S. Cl.
CPC ........ *C10M 171/02* (2013.01); *C10M 101/02* (2013.01); *C10M 107/02* (2013.01);
(Continued)

(58) Field of Classification Search
CPC ............ C10N 2240/10; C10N 2230/02; C10N 2230/74; C10N 2020/02; C10N 2020/04;
(Continued)

(56) References Cited

U.S. PATENT DOCUMENTS 1,815,022 A 7/1931 Davis
2,015,748 A 10/1935 Frolich
(Continued)

FOREIGN PATENT DOCUMENTS

CA 1094044 A 1/1981
EP 0089709 A 9/1983
(Continued)

OTHER PUBLICATIONS

Anastopoulos G., et al., "Lubrication Properties of Low-Sulfur Diesel Fuels in the Presence of Specific Types of Fatty Acid Derivatives", Energy & Fuels, vol. 15, No. 1, pp. 106-112, 2001.
(Continued)

*Primary Examiner* — Vishal V Vasisth

(57) ABSTRACT

This disclosure relates to cold cranking simulator viscosity ("CCSV") boosting base stocks that allow flexibility for engine oil formulations to meet both high and low temperature viscosity requirements while maximizing fuel efficiency. The CCSV-boosting base stocks can include C28-C60 hydrocarbon materials, linear esters, tertiary amides, dialkyl carbonates, aromatic alcohols, and aromatic ethers. This disclosure also relates to lubricating oil formulations containing the CCSV-boosting base stocks, and a method for determining the CCSV-boosting efficacy of a base stock.

24 Claims, 17 Drawing Sheets

(51) Int. Cl.
*C10M 107/02* (2006.01)
*C10M 101/02* (2006.01)
*G01N 11/02* (2006.01)
G01N 11/00 (2006.01)
C10N 20/02 (2006.01)
C10M 171/00 (2006.01)
C10N 30/02 (2006.01)
C10N 30/00 (2006.01)
C10N 40/25 (2006.01)

(52) U.S. Cl.
CPC ........... *C10M 169/04* (2013.01); *G01N 11/02* (2013.01); *C10M 171/00* (2013.01); *C10M 2203/1025* (2013.01); *C10M 2205/0206* (2013.01); *C10M 2205/0285* (2013.01); *C10M 2207/0235* (2013.01); *C10M 2207/0406* (2013.01); *C10M 2207/2815* (2013.01); *C10M 2207/325* (2013.01); *C10M 2215/0806* (2013.01); *C10N 2020/02* (2013.01); *C10N 2030/02* (2013.01); *C10N 2030/54* (2020.05); *C10N 2040/25* (2013.01); *G01N 2011/0026* (2013.01)

(58) Field of Classification Search
CPC ............ C10N 2030/02; C10N 2030/08; C10N 2030/74; C10M 2203/022; C10M 2207/2815; C10M 2207/325; C10M 2215/285; C10M 2203/065; C10M 2207/0406
See application file for complete search history.

(56) References Cited

U.S. PATENT DOCUMENTS

| | | | |
|---|---|---|---|
| 2,191,498 A | 2/1940 | Reiff | |
| 2,387,501 A | 10/1945 | Dietrich | |
| 2,655,479 A | 10/1953 | Munday et al. | |
| 2,666,746 A | 1/1954 | Munday et al. | |
| 2,721,877 A | 10/1955 | Popkin et al. | |
| 2,721,878 A | 10/1955 | Popkin | |
| 2,817,693 A | 12/1957 | Jacob et al. | |
| 3,036,003 A | 5/1962 | Arthur | |
| 3,087,936 A | 4/1963 | Le Suer | |
| 3,149,178 A | 9/1964 | Hamilton et al. | |
| 3,172,892 A | 3/1965 | Le Suer et al. | |
| 3,200,107 A | 8/1965 | Le Suer | |
| 3,219,666 A | 11/1965 | Norman et al. | |
| 3,250,715 A | 5/1966 | Wyman | |
| 3,254,025 A | 5/1966 | Le Suer | |
| 3,272,746 A | 9/1966 | Le Suer et al. | |
| 3,275,554 A | 9/1966 | Hendrik | |
| 3,316,177 A | 4/1967 | Dorer | |
| 3,322,670 A | 5/1967 | Burt et al. | |
| 3,329,658 A | 7/1967 | Fields | |
| 3,341,542 A | 9/1967 | Le Suer et al. | |
| 3,382,291 A | 5/1968 | Brennan | |
| 3,413,347 A | 11/1968 | Worrel | |
| 3,438,757 A | 4/1969 | Honnen et al. | |
| 3,444,170 A | 5/1969 | Norman et al. | |
| 3,449,250 A | 6/1969 | Fields | |
| 3,454,555 A | 7/1969 | Van Der Voort et al. | |
| 3,454,607 A | 7/1969 | Le Suer et al. | |
| 3,519,565 A | 7/1970 | Coleman | |
| 3,541,012 A | 11/1970 | Stuebe | |
| 3,565,804 A | 2/1971 | Honnen et al. | |
| 3,595,791 A | 7/1971 | Cohen | |
| 3,630,904 A | 12/1971 | Musser et al. | |
| 3,632,511 A | 1/1972 | Liao | |
| 3,652,616 A | 3/1972 | Watson et al. | |
| 3,666,730 A | 5/1972 | Coleman | |
| 3,666,827 A | 5/1972 | Carlson et al. | |
| 3,687,849 A | 8/1972 | Abbott | |
| 3,697,574 A | 10/1972 | Piasek et al. | |
| 3,702,300 A | 11/1972 | Coleman | |
| 3,703,536 A | 11/1972 | Piasek et al. | |
| 3,704,308 A | 11/1972 | Piasek et al. | |
| 3,725,277 A | 4/1973 | Worrel | |
| 3,725,480 A | 4/1973 | Traise et al. | |
| 3,726,882 A | 4/1973 | Traise et al. | |
| 3,742,082 A | 6/1973 | Brennan | |
| 3,751,365 A | 8/1973 | Piasek et al. | |
| 3,755,433 A | 8/1973 | Hellmuth | |
| 3,756,953 A | 9/1973 | Piasek et al. | |
| 3,769,363 A | 10/1973 | Brennan | |
| 3,780,128 A | 12/1973 | Shubkin | |
| 3,787,374 A | 1/1974 | Adams | |
| 3,798,165 A | 3/1974 | Piasek et al. | |
| 3,803,039 A | 4/1974 | Piasek et al. | |
| 3,822,209 A | 7/1974 | Knapp et al. | |
| 3,837,023 A | 8/1974 | Ladeur et al. | |
| 3,876,720 A | 4/1975 | Heilman et al. | |
| 3,948,800 A | 4/1976 | Meinhardt | |
| 4,100,082 A | 7/1978 | Clason et al. | |
| 4,149,178 A | 4/1979 | Estes | |
| 4,218,330 A | 8/1980 | Shubkin | |
| 4,234,435 A | 11/1980 | Meinhardt et al. | |
| 4,239,930 A | 12/1980 | Allphin et al. | |
| 4,367,352 A | 1/1983 | Watts et al. | |
| 4,413,156 A | 11/1983 | Watts et al. | |
| 4,426,305 A | 1/1984 | Malec | |
| 4,434,408 A | 2/1984 | Baba et al. | |
| 4,454,059 A | 6/1984 | Pindar et al. | |
| 4,594,172 A | 6/1986 | Sie | |
| 4,658,078 A | 4/1987 | Slaugh et al. | |
| 4,767,551 A | 8/1988 | Hunt et al. | |
| 4,798,684 A | 1/1989 | Salomon | |
| 4,827,064 A | 5/1989 | Wu | |
| 4,827,073 A | 5/1989 | Wu | |
| 4,897,178 A | 1/1990 | Best et al. | |
| 4,910,355 A | 3/1990 | Shubkin et al. | |
| 4,921,594 A | 5/1990 | Miller | |
| 4,943,672 A | 7/1990 | Hamner et al. | |
| 4,952,739 A | 8/1990 | Chen | |
| 4,956,122 A | 9/1990 | Watts et al. | |
| 4,975,177 A | 12/1990 | Garwood et al. | |
| 5,068,487 A | 11/1991 | Theriot | |
| 5,084,197 A | 1/1992 | Galic et al. | |
| 5,086,487 A | 1/1992 | Katayama et al. | |
| 5,264,642 A | 11/1993 | Wu | |
| 5,358,628 A | 10/1994 | Apelian et al. | |
| 5,366,648 A | 11/1994 | Salomon et al. | |
| 5,382,739 A | 1/1995 | Atkins et al. | |
| 5,430,105 A | 7/1995 | Redpath et al. | |
| 5,688,887 A | 11/1997 | Bagheri et al. | |
| 5,705,458 A | 1/1998 | Roby et al. | |
| 5,728,907 A | 3/1998 | Squicciarini et al. | |
| 6,034,039 A | 3/2000 | Gomes et al. | |
| 6,080,301 A | 6/2000 | Berlowitz et al. | |
| 6,090,989 A | 7/2000 | Trewella et al. | |
| 6,165,949 A | 12/2000 | Berlowitz et al. | |
| 69,851,605 | 10/2005 | Cody et al. | |
| 6,992,049 B2 | 1/2006 | Deckman et al. | |
| 7,687,445 B2 | 3/2010 | Rosenbaum et al. | |
| 7,989,670 B2 | 8/2011 | Wu et al. | |
| 8,921,291 B2 | 12/2014 | Wu et al. | |
| 2003/0055184 A1 | 3/2003 | Song et al. | |
| 2003/0191032 A1 | 10/2003 | Deckman et al. | |
| 2006/0105920 A1 | 5/2006 | Dalman et al. | |
| 2006/0172898 A1 | 8/2006 | Roby et al. | |
| 2006/0247138 A1 | 11/2006 | Rosenbaum et al. | |
| 2008/0020950 A1 | 1/2008 | Gray et al. | |
| 2009/0036725 A1 | 2/2009 | Wu et al. | |
| 2009/0181873 A1* | 7/2009 | Ryklin | A61K 8/39 510/123 |
| 2013/0023456 A1* | 1/2013 | Teshima | C10M 111/04 508/591 |
| 2013/0023705 A1* | 1/2013 | Teshima | C10M 111/04 585/13 |
| 2013/0030226 A1* | 1/2013 | Teshima | C10M 169/041 585/13 |

(56) References Cited

U.S. PATENT DOCUMENTS

| | | | |
|---|---|---|---|
| 2013/0090277 A1* | 4/2013 | Martin | C10M 169/04 |
| | | | 508/459 |
| 2013/0902077 | 4/2013 | Martin et al. | |
| 2015/0094242 A1* | 4/2015 | Sanchez | C10M 177/00 |
| | | | 508/110 |
| 2015/0119303 A1* | 4/2015 | Guerin | C10M 145/00 |
| | | | 508/287 |
| 2015/0126419 A1* | 5/2015 | Lerasle | C10M 161/00 |
| | | | 508/364 |
| 2015/0344805 A1* | 12/2015 | Dance | C10M 157/04 |
| | | | 508/293 |
| 2016/0237375 A1 | 8/2016 | Hogendoorn | |
| 2017/0183594 A1 | 6/2017 | Courtiade et al. | |
| 2017/0226441 A1 | 8/2017 | Courtiade et al. | |
| 2018/0112148 A1 | 4/2018 | Bouvier et al. | |

FOREIGN PATENT DOCUMENTS

| | | |
|---|---|---|
| EP | 0089709 A1 | 9/1983 |
| EP | 464546 A1 | 1/1992 |
| GB | 1350257 A | 4/1974 |
| GB | 1390359 A | 4/1975 |
| GB | 1440230 A | 6/1976 |
| WO | 2003/020856 | 3/2003 |
| WO | 2003/064571 | 8/2003 |
| WO | 2004/033606 A | 4/2004 |
| WO | 2007002005 A | 1/2007 |
| WO | 2016/150950 A | 9/2016 |

OTHER PUBLICATIONS

Onopchenko, A., et al. "Tetraalkylsilanes via Hydrosilylation of 1-Alkenes"Journal of Chemical Eng. Data, vol. 33, pp. 64-66, 1988.

Henderson, "Gas to Liquids", Synthetics, Mineral Oils, and Bio-Based Lubricants: Chemistry and Technology, Second Edition, Chapter 19, 2013, pp. 333-346.

Kajdas et al., "Antiwear properties and tribochemical reactions of esters of palmitic acid and aliphatic alcohols in the steel-on-steel friction systems", Tribologia, vol. 29, pp. 389-402, 1998.

Anastopoulos et al., "Lubrication Properties of Low-Sulfur Diesel Fuels in the Presence of Specific Types of Fatty Acid Derivatives", Energy & Fuels, vol. 15, pp. 106-112, 2001.

Onopchenko et al., "Tetraalkylsilanes via Hydrosilylation of 1-Alkenes", Journal of Chemical Eng. Data, vol. 33, pp. 64-66, 1988.

Singh et al., "Tribological Behavior of Some Hydrocarbon Compounds and Their Blends", Wear, vol. 139, pp. 425-437, 1990.

The International Search Report and Written Opinion of PCT/US2018/023922 dated Jul. 16, 2018.

* cited by examiner

COLD CRANKING SIMULATOR VISCOSITY BOOSTING BASE STOCKS AND LUBRICATING OIL FORMULATIONS CONTAINING THE SAME

CROSS-REFERENCE OF RELATED APPLICATIONS

This application claims priority to and the benefit of U.S. Provisional Application No. 62/476,024, filed Mar. 24, 2017, and is incorporated herein by reference.

FIELD OF THE DISCLOSURE

This disclosure relates to lubricating oil base stocks and formulations. In Particular, this disclosure relates to cold cranking simulator viscosity ("CCSV") boosting base stocks that allow flexibility for engine oil formulations to meet both high and low temperature viscosity requirements while maximizing fuel efficiency, lubricating oil formulations containing the CCSV-boosting base stocks, and a method for improving fuel efficiency in an engine by using as engine oil a lubricating oil formulation containing one or more of the CCSV-boosting base stocks.

BACKGROUND OF THE DISCLOSURE

Automotive engine oils conform to the SAE J300 metric for grading engine oil viscosity. For each SAE engine oil grade (e.g., 5W-20, 10W-30, etc.) there are maximum and minimum viscosity requirements at both high and low temperatures. Typically, such high temperature viscosity requirements are expressed as a permitted range of kinematic viscosity at 100° C. determined pursuant to ASTM D445 ("KV100"), and such low temperature viscosity requirements are expressed as a permitted range of cold cranking simulator viscosity determined pursuant to ASTM D5583.

Within a particular engine oil grade, it is theoretically possible to improve fuel economy by reducing the KV100 of the engine oil to the allowable minimum. In practice, it is difficult to achieve the minimum allowable KV100 in the engine oil, especially those of a 5W or 10W grade, without simultaneously reducing the CCSV below the SAE allowable limits. This is particularly true for formulations that utilize high quality Group III/IV base stocks that have excellent low temperature properties.

There is a need for an engine oil that exhibits a low KV100 and an acceptable CCSV permitted by the SAE grade designations. Particularly, there is a need of a CCSV-boosting base stock capable of providing the desired low KV100 and needed CCSV profiles, particularly a high CCSV, to oil formulations meeting SAE grade designation requirements. There is also a need for a method for determining the CCSV-boosting capability of a given base stock.

The present invention meets this and other needs.

SUMMARY OF THE DISCLOSURE

In a surprising and counterintuitive manner, it has been found that mixture oils comprising a CCSV-boosting base stock and other oils such as API Group IV base stocks can exhibit an abrupt and steep viscosity change in a narrow temperature segment within the large temperature zone from −40 to 25° C. The mixture oil may also exhibit a peak on the differential scanning calorimetry ("DSC") diagram obtained in a scanning temperature range from −100 to 25° C. in the vicinity of the temperature where abrupt and steep viscosity change is observed.

A first aspect of the present disclosure relates to an oil composition comprising a CCSV-boosting base stock as a first base stock and a reference oil different from the first base stock, exhibiting a viscosity measured at 0.1 s$^{-1}$ shear rate at a temperature T1° C. of v1(T1) Pa·s, a viscosity measured at 0.1 s$^{-1}$ shear rate at the temperature T2° C. of v1(T2) Pa·s, where −35≤T1≤25, 0<T1−T2≤10, and v1(T2)/v1(T1)≥50.

A second aspect of the present disclosure relates to a lubricating oil base stock (a CCSV-boosting base stock) having a KV100 in the range from 3.0 to 12.0 cSt, a Noack Volatility value ("NV") of no higher than 20%, and the following properties: when blended with a reference oil which is a Group IV base stock having a KV100 of 4.0 cSt to form a mixture oil comprising the co-base stock at a concentration of 10 wt %, based on the total weight of the mixture oil, the mixture oil exhibits at least one of the following (i) and (ii): (i) a viscosity measured at 0.1 s$^{-1}$ shear rate at a temperature T1° C. of v(T1) Pa·s, a viscosity measured at 0.1 s$^{-1}$ shear rate at the temperature T2° C. of v(T2) Pa·s, where −35≤T1≤25, 0<T1−T2≤10, v1(T2)/v1(T1)≥50; and (ii) a peak in the vicinity of the temperature of T1−5° C. on the DSC curve thereof in the temperature range from −60° C. to 25° C.

Further objects, features and advantages of the present disclosure will be understood by reference to the following drawings and detailed description.

DETAILED DESCRIPTION OF THE DISCLOSURE

Definitions

Figure 1:
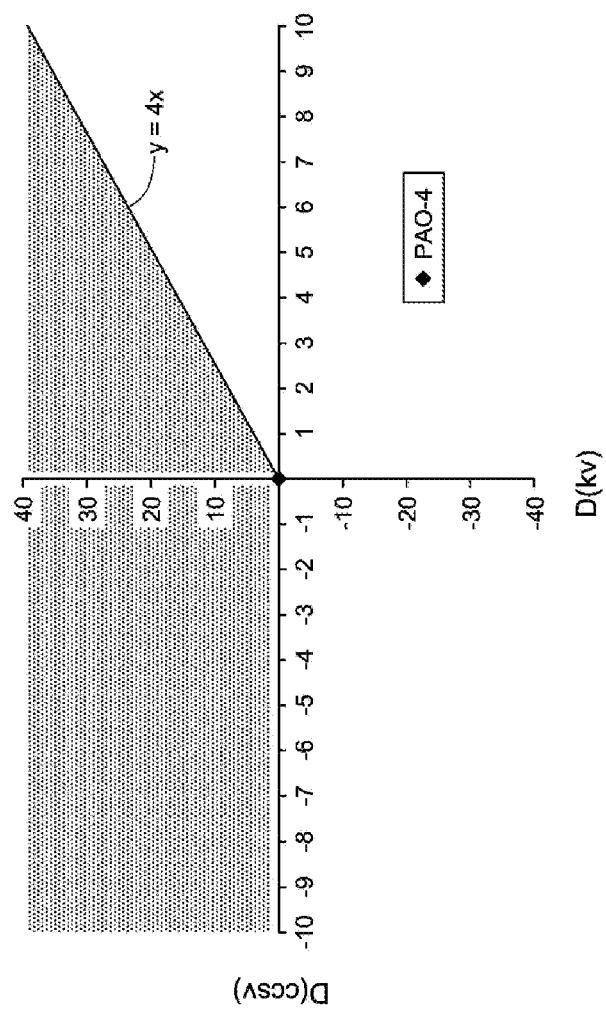
FIG. 1 is a diagram showing impact of a CCSV-boosting base stock of the present disclosure on KV100 and CCSV of a mixture oil containing the base stock and a reference oil.

"Alkyl group" refers to a saturated hydrocarbyl group consisting of carbon and hydrogen atoms.

"Hydrocarbyl group" refers to a group consisting of hydrogen and carbon atoms only. A hydrocarbyl group can be saturated or unsaturated, linear or branched linear, cyclic or acyclic, aromatic or non-aromatic.

"Cn" group or compound refers to a group or a compound comprising carbon atoms at total number thereof of n. Thus, "Cm-Cn" group or compound refers to a group or compound comprising carbon atoms at a total number thereof in the range from m to n. Thus, a C1-C50 alkyl group refers to an alkyl group comprising carbon atoms at a total number thereof in the range from 1 to 50.

"Carbon backbone" refers to the longest straight carbon chain in the molecule of the compound or the group in question. "Branches" refer to any non-hydrogen group connected to the carbon backbone.

"Mono-ester" refers to a compound having one ester (—C(O)—O—) functional group therein.

"Tertiary amide" refers to a compound having the following formula:

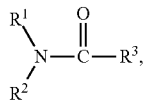

wherein $R^1$, $R^2$ and $R^3$ can be any group other than hydrogen.

"Dialkyl carbonate" refers to dialkyl ester of carbonate acid.

"Aromatic alcohol" refers to aromatic compounds having an aromatic ring structure and an alcohol (—OH) functional group therein directly connected to a carbon atom forming part of the aromatic ring structure.

"Aromatic ether" refers to an ether compound comprising an aromatic ring structure and an ether functional group (—O—) directly connected to a carbon atom forming part of the aromatic ring structure.

"SAE" refers to SAE International, formerly known as Society of Automotive Engineers, which is a professional organization that sets standards for internal combustion engine lubricating oils.

"SAE J300" refers to the viscosity grade classification system of engine lubricating oils established by SAE, which defines the limits of the classifications in rheological terms only.

"Lubricating oil" refers to a substance that can be introduced between two or more surfaces and lowers the level of friction between two adjacent surfaces moving relative to each other. A lubricant "base stock" is a material, typically a fluid at various levels of viscosity at the operating temperature of the lubricant, used to formulate a lubricant by admixing with other components. Non-limiting examples of base stocks suitable in lubricants include API Group I, Group II, Group III, Group IV, and Group V base stocks. PAOs, particularly hydrogenated PAOs, have recently found wide use in lubricant formulations as a Group IV base stock, and are particularly preferred. If one base stock is designated as a primary base stock in the lubricant, additional base stocks may be called a co-base stock.

"Alkyl naphthalene-type base stock" refers to a base stock consisting of alkyl-substituted naphthalene hydrocarbons having the following formula:

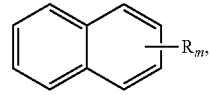

where each R is independently a C10-C20 alkyl, and m is 1, 2, or 3, and mixtures thereof.

All kinematic viscosity values in the present disclosure are as determined pursuant to ASTM D445. Kinematic viscosity at 100° C. is reported herein as KV100, and kinematic viscosity at 40° C. is reported herein as KV40. Unit of all KV100 and KV40 values herein is cSt unless otherwise specified.

All viscosity index ("VI") values in the present disclosure are as determined pursuant to ASTM D2270.

All Noack volatility ("NV") values in the present disclosure are as determined pursuant to ASTM D5800 unless specified otherwise. Unit of all NV values is wt %, unless otherwise specified.

All CCS viscosity ("CCSV") values in the present disclosure are as determined pursuant to ASTM 5293. Unit of all CCSV values herein is centipoise, unless specified otherwise. All CCSV values are measured at a temperature of interest to the lubricating oil formulation or oil composition in question. Thus, for the purpose of designing and fabricating engine oil formulations, the temperature of interest is the temperature at which the SAE J300 imposes a minimal CCSV. Thus, the CCSV measurement temperature in the present disclosure is: −35° C. for a SAE 5W grade oil; −30° C. for a SAE 10W grade oil; −25° C. for a SAE 15W grade oil; −20° C. for a SAE 20W grade oil; and −15° C. for a SAE 25W grade oil.

All viscosity other than kinematic viscosity and CCSV are measured by using a TA Instruments ARES-G2 rotational rheometer machine equipped with a serrated parallel plate fixture of 25 mm in diameter under steady shear deformation at a cooling rate of 2° C./minute starting at 25° C. and ending at −90° C. The machine is available from TA Instruments having an address at 159 Lukens Drive, New Castle, Del. 19720, U.S.A.

All percentages in describing chemical compositions herein are by weight unless specified otherwise. "Wt %" means percent by weight.

"In the vicinity of" a given temperature means within the range from 10° C. lower than that temperature to 10° C. higher than that temperature.

All numerical values within the detailed description and the claims herein are modified by "about" or "approximately" the indicated value, taking into account experimental error and variations that would be expected by a person having ordinary skill in the art.

I. CCSV-Boosting Base Stock

I.1 General

The base stock of the present disclosure desirably has a KV100 in the range from k1 to k2 cSt, where k1 and k2 can be, independently, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, and 20.0, as long as k1<k2. Preferably k1=3.0, and k2=12.0. Therefore, the base stock of the present disclosure has a relatively "low" viscosity at the normal operating temperature of an internal combustion engine lubricating oil.

The base stock of the present disclosure desirably has a NV value in the range from n1 to n2 wt %, where n1 and n2 can be, independently, 0.1, 0.5, 1, 2, 3, 4, 5, 6, 7, 8, 9, 10, 11, 12, 13, 14, 15, 16, 17, 18, 19, 20, as long as n1<n2. Preferably, n1=1, and n2=16. In general, for the same type of CCSV-boosting base stock, the larger the molecular weight of the molecule, the lower the NV value. For engine oils and base stocks for them, typically a low NV value is preferred, all other parameters held equal.

The base stock of the present disclosure when incorporated into a lubricating oil formulation desirably results in a CCSV of the formulation higher than that of the remainder of the lubricating oil formulation absent the CCSV-boosting base stock. Therefore, it is called a CCSV-boosting base stock. Desirably the CCSV-boosting base stock of the present disclosure has a high thickening effect at a relatively "low" temperature of significance to the particular oil in question (e.g., the temperature at which the SAE J300 imposes a minimal CCSV for a SAE grade engine oil, such as −35° C. for a SAE 5W grade engine oil) that an automobile engine may experience from time to time during its normal life. The CCSV-boosting base stock of the present disclosure may therefore manifests itself as a solid, a wax, or a viscous fluid at −35° C.

Such CCSV-boosting base stock of the present disclosure can be used as a primary base stock or a co-base stock in any lubricating oil formulation. Preferably, the CCSV-boosting base stock of the present disclosure (referred to as "the first base stock" sometimes) is used as a co-base stock in conjunction with a second base stock designated as a primary base stock. In certain applications, it may be desirable to include two or even more additional base stocks in the lubricating oil, in addition to the CCSV-boosting base stock of the present disclosure. For the convenience of description, the CCSV-boosting base stock will hereinafter be merely referred to as a generic base stock, regardless of its primary base stock or co-base stock designation.

The CCSV-boosting base stock desirably has the following properties: when blended with a reference oil which is a cPAO Group IV base stock having a KV100 of 4.0 cSt ("PAO-4") to form a mixture oil comprising the co-base stock at a concentration of 10 wt %, based on the total weight of the mixture oil, the mixture oil exhibits at least one of the following (i) and (ii):

(i) a viscosity measured at 0.1 $s^{-1}$ shear rate at a temperature T1° C. of v1(T1) Pa·s, a viscosity measured at 0.1 $s^{-1}$ shear rate at the temperature T2° C. of v1(T2) Pa·s, where −35≤T1≤25, 0<T1−T2≤10, and v1(T2)/v1(T1)≥50 (preferably v1(T2)/v1(T1)≥80, more preferably v(T2)/v(T1) ≤100, more preferably v1(T2)/v1(T1)≥500, still more preferably v1(T2)/v1(T1)≥1000, still more preferably v1(T2)/v1(T1)≥5000); and (ii) a peak in the vicinity of the temperature of T1−5° C. (e.g., in the range from T1−25 to T1+20° C., preferably in the range from T1−15 to T1+5° C.) on the DSC curve thereof in the temperature range from −60° C. to 25° C.

Thus, desirably when a CCSV-boosting base stock of the present disclosure is blended with a PAO-4 Group IV base stock at 10 wt % treat rate, the resultant mixture oil exhibits a sharp viscosity increase when cooled down in a narrow temperature range (i.e., T1-T2, which can be 10, 9, 8, 7, 6, 5, 4, or 3) within the broad range of 25° C. to −45° C. Without intending to be bound by a particular theory, this is believed to be due to a phase separation of the CCSV-boosting base stock in the mixture oil in that temperature zone. The corresponding peaks on the DSC curves in the vicinity of the temperature of T1−5° C. supports the theory of phase separation.

Desirably, the sharp viscosity change exhibited by the mixture oil is dependent on the shear rate during viscosity measurement. Normally, the higher the shear rate during viscosity measurement, the less dramatic the viscosity increase is when the mixture oil is cooled down. Nonetheless, it is desired that at a shear rate of 10 $s^{-1}$, the viscosity change is still quite conspicuous, such that the mixture oil exhibits a viscosity at a temperature T1° C. of v2(T1) Pa·s, a viscosity at the temperature T2° C. of v2(T2) Pa·s, where T1 and T2 are the same numbers in the viscosity measurement at the shear rate of 0.1 $s^{-1}$, and v2(T2)/v2(T1)≥10 (preferably v2(T2)/v2(T1)≥20, preferably v2(T2)/v2(T1) ≥50, more preferably v2(T2)/v2(T1)≥80, more preferably v2(T2)/v2(T1)≥100, still more preferably v2(T2)/v2(T1) ≥500, still more preferably v2(T2)/v2(T1)≥1000).

Some of the preferred CCSV-boosting base stocks of the present disclosure when blended with PAO-4 at 10 wt % treat rate thereof results in the mixture oil exhibiting an abrupt and large viscosity change in a narrow temperature range in the broad range of 25 to −45° C. even when the viscosity is measured at a high shear rate of 100 $s^{-1}$. In such case, above and beyond the steep viscosity change observed at low shear rates of 0.1 $s^{-1}$ and 10 $s^{-1}$ above, the mixture oil further exhibits a viscosity measured at a shear rate of 100 $s^{-1}$ at a temperature T1° C. of v3(T1) Pa·s, a viscosity at the temperature T2° C. of v3(T2) Pa·s, where T1 and T2 are the same numbers as in the viscosity measurement at the shear rate of 0.1 $s^{-1}$, and v3(T2)/v3(T1)≥2 (preferably v3(T2)/v3 (T1)≥5, more preferably v3(T2)/v3(T1)≥10, more preferably v3(T2)/v3(T1)≥50, still more preferably v3(T2)/v3(T1) ≥80, still more preferably v3(T2)/v3(T1)≥100).

The viscosity change as a function of temperature of the base stock of the present disclosure desirably is shear-dependent. Thus, it is desirable that (v1(T2)/v1(T1))/(v2 (T2)/v2(T1))≥k, where k can be, e.g., 5, 10, 50, 100, 500, 1000, or even a larger number. It is desirable that ((v2(T2)/ v2(T1))/(v3(T2)/v3(T1))≥m, where m can be, e.g., 5, 10, 50, 100, 500, 1000, or even a larger number.

The shear rate-dependence of the binary blends of PAO-4 and the CCSV-boosting base stocks of the present disclosure can be interpreted by the formation of a new phase as well. Without intending to be bound by a particular theory, it is believed that at a high shear rate, the separated phase does not have sufficient time to congregate to form large bodies of high-viscosity material in the mixture oil and instead is dispersed as small islets and partially solubilized due to the rigorous mixing caused by the high shear rate. On the contrary, at a low shear rate, large bodies of the separated phase can form, which manifest themselves in the sharp increase of viscosity in a narrow temperature range of the mixture oil.

The CCSV-boosting base stock of the present disclosure is preferably used for formulating automobile engine lubricating oils, preferably those meeting the SAE J300 classification standards. However, it is contemplated that the base stock of the present disclosure may be used to formulate other lubricating oils (e.g., automobile drive-line oils, industrial lubricating oils, gear oils, greases, and the like), heat transfer oils (e.g., transformer oils), hydraulic power transfer oils, processing oils, and the like.

The CCSV-boosting base stock can desirably include at least one of a C28-C60 hydrocarbon material, a linear mono-ester, a tertiary amide, a dialkyl carbonate, an aromatic alcohol, and an aromatic ether, each described in detail below.

I.2 C28-C60 Hydrocarbon Material

One exemplary base stock of the present disclosure comprises a C28-C60 hydrocarbon material having a carbon backbone comprising on average 25 to 60 carbon atoms and on average no more than 5 branches attached to the carbon backbone per molecule. Preferably, the hydrocarbon material has on average no more than 3 branches attached to the carbon backbone thereof, and more preferably no more than 1.5. For example, on average and per molecule, the hydrocarbon material may comprise about 1.0 branches attached to the carbon backbone. Preferably, those branches attached to the long carbon backbone of the hydrocarbon material molecules are also short, e.g., containing no more than 3, preferably no more than 2, and more preferably no more than 1, carbon atom(s). Thus, in a particularly desirable embodiment, the C28-C60 hydrocarbon material contains, on average and per molecule, substantially only about one methyl group. Preferably, the methyl group is attached to the carbon atom in the center of the carbon backbone (if there is a center carbon atom, such as in the case when the carbon backbone has an odd number of carbon atoms) or to any of the two, three, four, or five carbon atoms closest to the center of the carbon backbone at one side of the center. Non-limiting examples of such C28-C60 hydrocarbon include the following: 13-methylhepotacosane ($C_{28}H_{58}$), 14-methylhepotacosane, 15-methylhepotacosane, 14-methylnonacosane ($C_{30}H_{62}$), 15-methylnonacosane, 16-methylnonacosane, 15-methylhentriacontane ($C_{32}H_{66}$), 16-methylhentriacontane, 17-methylhentriacontane, 16-methyltritriacontane ($C_{34}H_{70}$), 17-methyltritriacontane, and 18-methyltritriacontane.

The C28-C60 hydrocarbon material can be made by dimerization of one or more C8-C30 linear alpha-olefin in the presence of a catalyst system. Thus, to achieve a C28 dimer, one can dimerize a mixture of C8 and C20; a mixture of C10 and C18, a mixture of C12 and C16, and preferably C14 only. A dimer of C14 only can be made to have a relatively high purity with a very narrow distribution of molecular weight and a very few categories of isomers therein, making the hydrocarbon material a wax-like material at −35° C., which is particularly desirable for use as the CCSV-boosting base stock of the present disclosure. Any C28-C60 dimer can be likewise made from the dimerization of a mixture of two or more types of olefins, but preferably from the dimerization of substantially a single olefin (e.g., from an olefin feed containing at least 90 wt % of the desired olefin monomer, based on the total weight of all the olefins contained in the feed that can undergo the dimerization reactions under the dimerization conditions). Thus, a C40 hydrocarbon material suitable for the base stock of the present disclosure is preferably made from the dimerization of substantially only C20 olefin (e.g., a C20 olefin feed containing at least 90 wt % (or at least 92 wt %, 95 wt %, 96 wt %, 98 wt %, or even 99 wt %) of C20 olefin, based on the total weight of all olefins contained in the feed).

While the C28-C60 hydrocarbon material useful for the base stock of the present disclosure can contain unsaturation such as C═C bonds in the molecules to various degrees, it is highly desired that such hydrocarbon material is substantially saturated, e.g., it may comprise less than 10%, preferably less than 5%, more preferably less than 3%, even more preferably less than 1%, by mole of the hydrocarbon molecules that contain one or more C═C bonds therein. Such high level of saturation can be achieved by contacting an olefin-containing hydrocarbon material with a hydrogen-containing atmosphere in the presence of a hydrogenation catalyst. A low level of C═C bonds in the hydrocarbon material makes it suitable for use in an engine oil formulation desired to have a long life and an extended drain internal.

Without intending to be bound by a particular theory, it is believed that a long-chain C28-C60 hydrocarbon material described above, containing a long carbon backbone and very small number of short branches, if any at all, attached to the carbon backbone, is particularly useful to impart the CCSV-boosting effect of the base stock of the present disclosure without significantly impacting the KV100 behavior of a formulated oil. The molecular structure of the hydrocarbon imparts to it a low viscosity at higher temperatures (e.g., 100° C.), and a tendency to crystallize at low temperatures (e.g., −35° C.) whereby it thickens quickly, resulting in its mixture with a reference oil to have a low-temperature viscosity (i.e., CCSV) that is significantly higher than the reference oil.

Such long-chain C28-C60 hydrocarbon materials having few branches that are also short can be advantageously made by the dimerization of an olefin, preferably an alpha-olefin, in the presence of a catalyst system containing a metallocene compound. Preferred metallocene-catalyzed dimers are C28-C40, or C28-C36, or C28-C32, or even substantially all C28 hydrocarbons. Various metallocene compound-based catalyst systems can be used for this purpose. A group of particularly useful metallocene-compound-based catalyst system for such purpose can be found in, e.g., U.S. Publication No. 2013/0023633 A1, the content of which is incorporated herein by reference in its entirety. U.S. Pat. No. 4,658,078 discloses a process using a catalyst system comprising biscyclopentadienyl zirconium dichloride as the metallocene compound and methylaluminoxane as an activator in making dimers of linear alpha-olefins such as 1-octene. The process can be adapted for making the unsaturated intermediate of the metallocene-catalyzed dimers useful as the C28-C60 hydrocarbon base stock of the present disclosure. Contents of this patent is incorporated herein by reference in its entirety. Dimers produced from dimerization reaction can be purified by distillation/flashing to remove residual monomers and solvents (if any), and then hydrogenated to make a substantially saturated dimer useful for the base stock of the present disclosure. High-purity dimers containing a single compound at a concentration of at least 80 mol % (preferably at least: 85, 90, 95, 96, 97, 98, or even 99 mol %) are desired for the CCSV-boosting base stock of the present disclosure. Thus, a dimer product made from dimerization of 1-tetradecene in the presence of a metallocene-compound-based catalyst system followed by hydrogenation can primarily have the following structure:

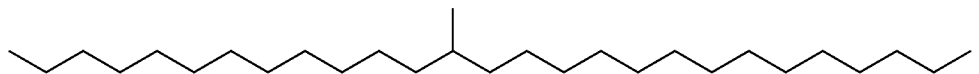
The above structure is a mono-methyl C28 paraffin having the methyl at the 14th carbon atom counted from either end of the molecule. The following are examples of preferred mono-methyl paraffins for the CCSV-boosting hydrocarbon base stocks:

C28 mono-methyl paraffin having a C27 carbon backbone with the methyl connected to the 12th, 13th, 14th, 15th, 16th, or 17th carbon atom counted from either end of the carbon backbone;

C30 mono-methyl paraffin having a C29 carbon backbone with the methyl connected to the 13th, 14th, 15th, 16th, or 17th carbon counted from either end;

C32 mono-methyl paraffin having a C31 carbon backbone with the methyl connected to the 14th, 15th, 16th, 17th, or 18th carbon counted from either end;

C34 mono-methyl paraffin having a C33 carbon backbone with the methyl connected to the 15th, 16th, 17th, 18th, or 19th carbon counted from either end;

C36 mono-methyl paraffin having a C35 carbon backbone with the methyl connected to the 15th, 16th, 17th, 18th, 19th or 20th carbon counted from either end;

C38 mono-methyl paraffin having a C37 carbon backbone with the methyl connected to the 16th, 17th, 18th, 19th, 20th, 21th carbon counted from either end; and C40 mono-methyl paraffin having a C39 carbon backbone with the methyl connected to the 15th, 16th, 17th, 18th, 19th or 20th carbon counted from either end.

Dimerization of olefins (e.g., alpha-olefins) in the presence of Lewis acid-based catalyst systems (e.g., BF3, AlCl3, and the like) tend to produce dimers having more branches attached to the carbon backbone compared to the dimers made by using highly selective metallocene-compound-based catalyst systems described above. Such conventional, non-metallocene-based catalyst system and oligomerization processes are described in e.g., WO2006/101585A1, WO2010/002485, and EP134270B1, the contents of all of which are incorporated by reference in their entirety. Without intending to be bound by a particular theory, it is believed that the shifting of the C═C double bonds in the monomer molecules in the reaction mixture in the presence of the acid catalyst caused such phenomenon. Nonetheless, it has been found that C28-C60 hydrocarbon materials made from dimerization of alpha-olefin monomers in the presence of Lewis acid-based catalyst systems can be used as a CCSV-boosting base stock of the present disclosure, particularly those C32-C60 hydrocarbons made from dimerization of alpha-olefins such as at least one of 1-tetradecene, 1-hexadecene, 1-octadecene, and 1-icosene. Preferred non-metallocene-catalyzed dimers are C36-C60, or C36-C56, or C36-C52, or C36-C48, or C36-C42 hydrocarbons. Likewise, dimers made from a relatively high-purity single monomer feed is preferred to obtain a dimer with a relatively high homogeneity in molecular structures and physical properties. C36 dimer made from 1-octadecene in the presence of Lewis-acid catalyst system is particularly advantageous as a CCSV-boosting base stock of the present disclosure. The dimers as made from the oligomerization reactor tend to contain a high degree of unsaturation in the molecules. For use as a base stock in a lubricating oil, it is desirable that it is subsequently hydrogenated to remove a great majority of the unsaturation in the molecules.

I.3 Linear Mono-esters

Illustrative linear ester useful as the CCSV-boosting base stock include, e.g., linear mono-esters having the following formula 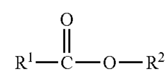 (i.e., $R^1$—C(O)—O—$R^2$), where $R^1$ and $R^2$ are each independently a linear hydrocarbyl group each comprising from 4 to 30 carbon atoms, and $R^1$ and $R^2$ taken together comprise, in total, at least 20 carbon atoms and no more than 40 carbon atoms. Preferably, $R^2$ contains more carbon atoms than $R^1$. Preferably, $R^1$ is a C6-C20 linear alkyl group (e.g., n-hexyl, n-heptyl, n-octyl, n-nonyl, n-decyl, n-undecyl, n-dodecyl, n-tridecyl, n-tetradecyl, n-heptadecyl, n-octadecyl, n-nonadecyl, and n-icosyl), and $R^2$ is a C10-C20 linear alkyl group (e.g., n-decyl, n-undecyl, n-dodecyl, n-tridecyl, n-tetradecyl, n-heptadecyl, n-octadecyl, n-nonadecyl, and n-icosyl).

Illustrative linear mono-ester base stocks of the present disclosure include, e.g., n-decyl palmitate, n-dodecyl palmitate, n-decyl stearate, and n-dodecyl stearate. Linear, synthetic mono-ester base stock can be prepared by the condensation reaction of linear fatty acids (e.g., C10-C20 linear fatty acids having the structure HO—C(O)—$R^2$) and linear alcohols (e.g., C6-C20 linear aliphatic alcohols, preferably primary linear alcohols, $R^1$—OH). Preferably, the ester has 26 carbons and is prepared from palmitic acid (C16) and n-decanol (C10) to make decyl palmitate. The molecular structure of n-decyl stearate is illustrated below:

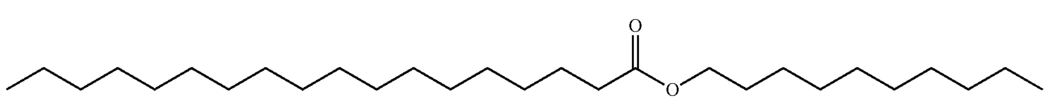

As can be seen, this structure of the mono-ester share certain commonalities with the molecular structure of the C28-C60 hydrocarbon material as described above. Such commonalities include: (i) a relatively long chain (in the case of the C28-C60 hydrocarbon, the long chain being the carbon backbone; while in the case of the linear mono-ester, the long-chain being two carbon chains connected through a —O— linkage); (ii) a small number of branches attached to the long chain (no more than 5, preferably no more than 3, still more preferably no more than 1.5 per molecule, of branches in the case of the C28-C60 hydrocarbon material, and only 1 branch (the ═O group) in the case of the linear mono-ester); and (iii) the branch(es), if any, are relatively short. Such structural characteristics lend similar rheological behavior of these base stocks in pure form and when blending with other lubricating oil components to form the lubricating oil formulation at different temperatures, i.e., the desirable CCSV-boosting effect and acceptable or desirable KV100 of the lubricating oil.

I.4 Tertiary Amides

Illustrative CCSV-boosting tertiary amides useful as the CCSV-boosting base stock of the present disclosure include, e.g., those tertiary amides having the following formula:

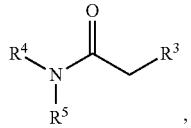

wherein $R^3$ is a linear C10-C30 alkyl group, preferably a linear C12-C20 alkyl group, more preferably a linear C12-C18 alkyl group; and $R^4$ and $R^5$ are, independently, each a linear C1-C20 alkyl group, preferably a linear C2-C16 alkyl group, more preferably a linear C4-C10 alkyl group; preferably $R^4$ and $R^5$ taken together comprise from 6 to 20 carbon atoms, more preferably from 8 to 16 carbon atoms.

Illustrative tertiary amides useful for the base stock of the present disclosure include, e.g., N,N-dibutylpalmamide, N,N-dibutylstearamide, and the like. Tertiary amide base stocks can be prepared by reacting a fatty acid or fatty acid derivative, such as fatty acid ester or fatty acid halide, with a secondary amine.

I.5 Dialkyl Carbonates

Illustrative dialkyl carbonates useful as the CCSV-boosting base stock of the present disclosure include, e.g., dialkyl carbonates having the following formula:

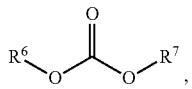

wherein $R^6$ and $R^7$ are, independently, each a linear C1-C40 alkyl group, preferably a linear C2-C30 alkyl group, more preferably a linear C4-C20 alkyl group. Taken together, $R^6$ and $R^7$ desirably comprise carbon atoms, in total, in a range from 16 to 40, preferably from 18 to 36, more preferably from 20 to 32. Preferably $R^6$ and $R^7$ are identical.

Illustrative dialkyl carbonates useful in the present disclosure include, e.g., di-n-dodecylcarbonate, and the like. Dialkyl carbonates with linear alkyl groups can be prepared by reacting dimethyl carbonate, diethyl carbonate, phosgene, or sodium carbonate with at least two equivalents of alcohol(s) each having a formula $R^6$—OH and $R^7$—OH, respectively. If $R^6$ and $R^7$ are identical (meaning a single alcohol is used for making the dialkyl ester, not a mixture of multiple alcohols), the resultant dialkyl carbonate ester can have highly uniform chemical composition and properties, lending it particularly useful for the CCSV-boosting base stock of the present disclosure. While it is possible to use a mixture of multiple different types of alcohols to make the dialkyl carbonate, doing so would result in a mixture of multiple carbonates with different molecular structures and molecular weights.

As can be seen, the molecular structure of the dialkyl carbonates useful for the CCSV-boosting base stock of the present disclosure also share the same structural commonalities shared by the C28-C60 hydrocarbon materials and the linear mono-esters: (i) a long linear chain formed by two linear alkyl groups $R^6$ and $R^7$ connected through a —O—C(O)—O linkage; (ii) a small number of branches connected to the long chain (the sole =O group); and (iii) the branch is short. These structural features are believed to contribute to the rheological behavior in pure form and the desired CCSV-boosting behavior of the dialkyl carbonates when blended with other lubricating oil components at different temperatures.

I.6 Aromatic Alcohols

Aromatic alcohols useful for the CCSV-boosting base stock of the present disclosure advantageously have the following formula:

wherein ring A is an aromatic ring structure (e.g., a phenyl ring, a naphthyl ring, a phenanthryl ring, a biphenyl group, an enthracyl ring, a 1H-phenalenyl ring, a benzofuran ring, an indenyl ring, a tetrahydronaphthyl ring, and the like, which may be optionally substituted or annelated to additional ring structures), the hydroxyl group is connected directly to a carbon atom that forms a part of the aromatic ring structure, $R^9$ is a C8-C30 (preferably C10-C28, more preferably C12-C26, still more preferably C12-C24) alkyl group having a C7-C30 carbon backbone and no more than five (preferably no more than 3, more preferably no more than 1) branches connected to the carbon backbone; and m is 1, 2, or 3 (preferably 1 or 2, more preferably 1). The exact location of the $R^9$ group(s) on the aromatic structure is not critical. Indeed, a mixture of multiple isomers of the aromatic alcohol type having identical aromatic nucleus and the same alkyl groups connected at differing locations on the aromatic nucleus can be advantageously used as the CCSV-boosting base stock of the present disclosure.

Illustrative aromatic alcohols useful for the CCSV-boosting base stock include, e.g., C10-naphthol (e.g., various isomers of n-decyl naphthol, various isomers of 1-methylnonyl naphthol, and mixtures thereof), C12 naphthol (e.g., various isomers of n-dodecyl naphthol, various isomers of 1-methylundecyl naphthol, and mixtures thereof), C14 naphthol (e.g., various isomers of n-tetradecyl naphthol, various isomers of 1-methyltridecyl naphthol, and mixtures thereof), C16 naphthol (e.g., various isomers of n-hexadecyl naphthol, various isomers of 1-methylpentadecyl naphthol, and mixtures thereof), and the like. Such carbon-alkylated naphthol aromatic alcohol base stocks can be prepared by reacting naphthols with linear alpha olefin in the presence of an acid catalyst or other alkylating agents. Usually a mixture of multiple isomers with differing distribution is obtained as the product. The combination of the presence of the long-chain alkyl group and the hydroxyl group connected to an aromatic nucleus in the molecules imparts the desired rheological behavior of the base stock and its desired CCSV-boosting effect and desired impact on the KV100 of the formulation when this type of base stock is blended with other components of a lubricating oil.

I.7 Aromatic Ethers

Aromatic ethers useful for the CCSV-boosting base stock of the present disclosure desirably have structures of the following formula:

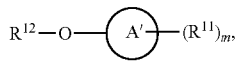

wherein ring A' is an aromatic ring structure (e.g., a phenyl ring, a naphthyl ring, a phenanthryl ring, a biphenyl group, a enthracyl ring, a 1H-phenalenyl ring, a benzofuran ring, an indenyl ring, a tetrahydronaphthyl ring, and the like, which may be optionally substituted or annelated to additional ring structures), the —O— group is connected directly to a carbon atom in the aromatic ring structure in ring A', $R^{11}$ and $R^{12}$, the same or different at each occurrence, independently is a C1-C30 (preferably C2-C24, more preferably C4-C20, still more preferably C6-C28) alkyl group having a C1-C30 (preferably C2-C24, more preferably C4-C20, still more preferably C6-C28) carbon backbone and on average no more than five (preferably no more than 3, more preferably no more than 1, still more preferably zero) branches connected to the carbon backbone in each $R^{11}$; m is 0, 1, 2, or 3 (preferably 0, 1, or 2; more preferably 0 or 1; still more preferably 0), and $R^{12}$ is a C1-C30 alkyl group having a C1-C30 carbon backbone and no more than five branches connected to the carbon backbone. Preferably, $R^{12}$ is a C8-C20 linear alkyl group or a branched linear alkyl group having a C7-C19 carbon backbone and no more than 5 (more preferably no more than 3, still more preferably no more than 1) branches connected to the carbon backbone. Preferably, the branches connected to the backbone of $R^{11}$ or $R^{12}$ comprise no more than 3 (more preferably no more than 2, still more preferably no more than 1) carbon atoms. Where m is 0, it is desirable that $R^{11}$ and $R^{12}$ have the same number of carbon atoms.

Illustrative aromatic ethers include, e.g., C14 naphthyl ether (e.g., 1-tetradecyl naphthyl ether, 1-methyltridecyl naphthyl ether, and mixture thereof). Such aromatic ether base stock can be prepared by reacting corresponding naphthols with corresponding alkylating agents, such as alkylhalides (e.g., $R^{12}$—Cl). In such reactions, it is possible to alkylate both the hydroxyl group (O-alkylation) and the aromatic ring (C-alkylation) simultaneously, resulting in a mixture of aromatic ethers and aromatic alcohols as described above, which can be used as a CCSV-boosting base stock of the present disclosure. Desirably essentially all of the hydroxyl groups are alkylated to obtain a mixture of substantially all aromatic ethers. The C-alkylation can be controlled to a certain degree by choosing the proper alkylating conditions (temperature, aromatic alcohol to alkylating agent molar ratio, catalysts, and the like). In certain situations, it may be desirable, however, to separate the C-alkylated aromatic ethers from the aromatic ethers not C-alkylated to obtain two fractions of aromatic ethers with distinct properties.

II. Method for Determining CCSV-Boosting Efficacy of Base Stocks

Different base stocks can have different CCSV-boosting efficacy when used at different quantities relative to the same reference oil. The same base stock may have the same, similar or different CCSV-boosting efficacy with respect to different reference oils. The following method can be used for determining the efficacy of a particular first base stock at a given concentration in a lubricating oil to serve as a CCSV-boosting base stock.

The method comprises steps of deterring the KV100 and CCSV at a low temperature of interest to the lubricating oil formulation in question (such as the temperature at which the SAE J300 standard imposes a minimal CCSV requirement, i.e., −35° C. for a SAE 5W grade oil, −30° C. for a SAE 10W grade oil, −25° C. for a SAE 15W grade oil, −20° C. for a SAE 20W grade oil, −15° C. for a SAE 25W grade oil) of a reference oil (KV100(ref) and CCSV(ref) respectively) to be combined with the first base stock, and the KV100 and CCSV at the same low temperature of a mixture oil consisting of the reference oil and the first base stock at the desired concentration of the first stock in the mixture oil (KV100(oil) and CCSV(oil), respectively).

Next, if CCSV(oil) is larger than CCSV(ref), and KV100 (oil) is smaller than KV100(ref), then the first base stock is determined as a CCSV-boosting base stock at the first concentration.

If CCSV(oil) is larger than CCSV(ref), and KV100(oil) is larger than KV100(ref), meaning that the addition of the first base stock into the reference oil results in the increase of the KV100 compared to the reference oil, then calculate the following values:

$$D(kv)=100\times(KV100(\text{oil})-KV100(\text{ref}))/KV100(\text{ref});$$

and $$D(\text{ccsv})=100\times(\text{CCSV(oil)}-\text{CCSV(ref)})/\text{CCSV(ref)}.$$

If D(ccsv)/D(kv)≥4.0, then the first base stock is determined as a CCSV-boosting base stock with respect to the reference oil at the first concentration. Those CCSV-boosting base stocks that demonstrate a D(ccsv)≥5 at a first concentration thereof is considered as a superior CCSV-boosting base stock at the first concentration. In general, for a positive D(ccsv), the larger it is, the more effective the first base stock is in boosting the CCSV of the mixture oil compared to the reference oil, and the more desirable it is, all other parameters held equal.

The above methodology can be reduced to expression in an x-y coordinate system, where the x-axis is D(kv), and the y-axis is D(ccsv). The two axes cross at (0,0) which represents the reference oil. Thus all first base stocks in the quadrant where x<0 and y>0 are CCSV-boosting base stocks. All first base stocks in the quadrants where y<0 are not CCSV-boosting base stocks. For any first base stock belonging to the quadrant where x>0 and y>0, if it is on or above the line defined by equation y=4x, then it is a CCSV-boosting base stock in the meaning of the present disclosure. Otherwise it is not a CCSV-boosting base stock in the meaning of the present disclosure. Those CCSV-boosting base stocks having a D(ccsv) falling on and above the line defined by y=5 are regarded as superior (preferred) CCSV-boosting base stock at the given concentration thereof. This diagrammatic representation is shown in FIG. 1, where the shaded area including the portion above line y=4x in the northeast quadrant and the northwest quadrant represents the impact of CCSV-boosting base stocks to a mixture oil consisting of the reference oil and the CCSV-boosting base stock.

Alternatively, the CCSV-boosting efficacy of a given first base stock can be determined by measuring the high temperature viscosity component at temperatures other than 100° C., e.g., 40° C. Likewise, measurement of the low temperature viscosity component can be conducted at temperatures other than −35° C., e.g., −30° C., −25° C., −20° C., −15° C., −10° C., and the like, as long as such temperature is of significance to the oil formulation in question. As mentioned above, SAE J300 imposes minimal CCSV requirements for the different grades of engine oils. For a given SAE J300 engine oil grade, the most preferred temperature at which the CCSV is made is the temperature at which the SAE J300 standard imposes the minimal CCSV requirement.

A first base stock determined to be a CCSV-boosting base stock at a first concentration may be tested for CCSV-boosting efficacy at a second concentration, or even more concentrations. Typically, a CCSV-boosting base stock demonstrates higher CCSV-boosting efficacy at higher concentrations in the mixture oil. Thus, if a CCSV-boosting base stock exhibits a D(ccsv)≥5 at a concentration of 5 wt % thereof based on the total weight of the mixture oil, then it is regarded as an overall superior (preferred) CCSV-boosting base stock. It is expected that an overall superior CCSV-boosting base stock will be a superior CCSV-boosting base stock at higher concentrations thereof in the mixture oil, such as at 6, 7, 8, 9, 10, 11, 12, 13, 14, 15, 20, 25, 30, 35, 40, 45, 50 wt %, based on the total weight of the mixture oil. Such CCSV-boosting base stock having CCSV-boosting efficacy, particularly a high CCSV-boosting efficacy characterized by a high D(ccsv) across a large range of concentrations are particularly desirable. Preferably, an overall superior CCSV-boosting base stock demonstrates a D(ccsv) at 5 wt % concentration thereof in the mixture oil of at least 8, 10, 15, 20, 25, 30, 35, 40, 45, 50, 60, 70, 80, 90, 100, 200, 500, 800, 1000, 2000, 5000, 6000, 8000, or even 10000. Certain highly advantageous CCSV-boosting base stock of the present disclosure may demonstrate a D(ccsv)≥5 even at concentrations such as 1, 2, 3, or 4 wt %, based on the total weight of the mixture oil. A first base stock found to be a CCSV-boosting base stock in a first reference oil is a good indicator that it will also be a CCSV-boosting base stock in a different, second reference oil with similar chemical composition to that of the first reference oil.

Preferably, the mixture oil consisting of the reference oil and the first base stock found to be a CCSV-boosting base stock is the interested lubricating oil.

In real life, the reference oil may be chosen as a combination of various base stocks of the final lubricating oil formulation. Once it is determined that the mixture oil consisting of the reference oil and the first base stock have the desired CCSV and KV100, one can then add additional components, such as additive packages typically used for the type of lubricating oil in question, to make the final lubricating oil.

Still it is possible that one may use a particular base stock for the final formulation of the lubricating oil as the reference oil. Such base stock reference oil desirably is the base stock having the closest KV100 to that of the first base stock, i.e., the CCSV-boosting base stock, among all base stocks in the formulation other than the first base stock. Alternatively, such base stock reference oil desirably can be the base stock having the closest CCSV(ref) to that of the first base stock at the interested temperature of the oil in question among all base stocks contained in the formulation other than the first base stock. For engine oil formulations, a commercial Group IV base stock, such as a conventionally catalyzed (i.e., non-metallocene-catalyzed) PAO having a KV100 of about 4 cSt ("PAO-4", such as SpectraSyn™ 4 commercially available from ExxonMobil Chemical Company having an address at 4500 Bayway Drive, Baytown, Tex., U.S.A.), may be used as the reference oil.

Furthermore, it is also possible that one may add additional base stocks into the mixture oil consisting of the reference oil and the first base stock, preferably at small quantities, to fine-tune the final lubricating oil formulations to the desired chemical composition with the optimal properties such as KV100 and CCSV. Desirably such KV100 and CCSV meet the requirements of a SAE J300 grade designation for an engine oil, 0W20, 0W30, 0W40, 5W20, 5W30, 5W40, 10W20, 10W30, 10W40, 15W20, 15W30, 15W40, 20W20, 20W30, 20W40, 25W20, 25W30, 25W40, grade oil.

Of course, once the final oil formulation is determined, one can form the product by mixing the various components in any order as appropriate to one having ordinary skill in the art. For example, the first base stock, the various components of the reference oil, and the various additives and additional components can be all mixed at the same time to obtain the oil formulation product, bypassing the step of forming the mixture oil of the first base stock and the reference oil. Furthermore, one may substitute the reference oil with a similar base stock or base stock mixture (e.g., those having a KV100 in the range from f1*KV100(ref) to f2*KV100(ref), where f1 and f2 can be, independently, 0.5, 0.6, 0.7, 0.8, 0.9, 1.0, 1.2, 1.3, 1.4, 1.5, 1.6, 1.7, 1.8, 1.9, 2.0, as long as f1<f2, and in the same API Group as the reference oil) in the lubricating oil formulation, knowing that the CCSV-boosting first base stock would behave similarly in mixtures with those substitute oils for the reference oils.

III. The Oil Composition Containing the CCSV-Boosting Base Stock

III.1 General

The CCSV-boosting base stocks of this disclosure are useful in formulating lubricating oils. The oil composition of the first aspect of the present disclosure summarized above can be a portion or the entirety of a lubricating oil formulation. Thus, the oil composition can be: (i) a mixture of the first base stock and the remainder of the formulation absent the first base stock; (ii) a mixture of the first base stock with one or more other base stocks contained in the lubricating oil formulation absent the additive components in the lubricating oil formulation; (iii) a mixture of the first base stock and all other base stocks contained in the lubricating oil formulation but absent any additive components that may be present in the lubricating oil formulation; (iv) a mixture of the first base stock and one or more other base stocks, but not all the other base stocks, contained in the lubricating oil formulation, and at least a portion of the additive components contained in the lubricating oil formulation; and (v) a mixture of the first base stock and all additive components contained in the lubricating oil formulation, but no other base stocks contained in the lubricating oil formulation.

Therefore, to make a final lubricating oil formulation of a product, one may add additional components, such as other base stocks, additional quantities of the materials already present in the oil composition, additive components, and the like. A particularly preferred embodiment of the oil composition of the present disclosure; however, is a lubricating oil formulation, in which case the reference oil is the remainder of the lubricating oil formulation absent the first base stock.

The oil composition (preferably, a lubricating oil formulation) has a KV100 of KV100(oil) and a CCSV at a given low temperature discussed above of CCSV(oil); the reference oil having a chemical composition of the remainder of the oil composition absent the first base stock has a KV100 and CCSV of KV100(ref) and CCSV(ref), respectively, and the following conditions (i) and (ii) are met:

$$d1 \leq D(kv) = 100 \times (KV100(\text{oil}) - KV100(\text{ref}))/KV100(\text{ref}) \leq d2, \quad \text{(i)}$$

where d1 and d2 can be, independently, −20, −18, −16, −15, −14, −12, −10, −8, −6, −5, −4, −2, 0, 2, 4, 6, 8, 10, 12, 14, 15, 16, 18, 20, 22, 24, 25, 26, 28, 30, 32, 34, 36, 38, 40, as long as d1<d2; preferably d1=−10, and d2=20; and $$d3 \leq D(\text{ccsv}) = 100 \times (CCSV(\text{oil}) - CCSV(\text{ref}))/CCSV(\text{ref}), \quad \text{(ii)}$$

preferably but not necessarily 100×((CCSV(oil)−CCSV(ref))/CCSV(ref)≤d4, where d3 and d4 can be, independently, 1, 2, 3, 4, 5, 6, 7, 8, 9, 10, 12, 14, 15, 16, 18, 20, 22, 24, 25, 26, 28, 30, 32, 34, 36, 38, 40, 45, 50, 55, 60, 65, 70, 75, 80, 85, 90, 95, 100, 200, 400, 500, 600, 800, 1000, 2000, 4000, 5000, 6000, 8000, 10000, as long as d3<d4; preferably d3=3, and d2=80; more preferably d3=5, and d4=60.

In one preferred embodiment, the following conditions (i) and (ii) are met:

$$d5 \leq D(kv) \leq d6, \quad (i)$$

where d5 and d6 can be, independently, −20, −18, −16, −15, −14, −12, −10, −8, −6, −5, −4, −2, 0, as long as d5<d6; preferably d5=−15, and d6=0; more preferably d5=−10, and d6=−1; and $$d7 \leq D(ccsv) \leq d8, \quad (ii)$$

where d7 and d8 can be, independently, 3, 4, 5, 6, 7, 8, 9, 10, 12, 14, 15, 16, 18, 20, 22, 24, 25, 26, 28, 30, 32, 34, 36, 38, 40, 45, 50, 55, 60, 65, 70, 75, 80, 85, 90, 95, 100, 200, 400, 500, 600, 800, 1000, 2000, 4000, 5000, 6000, 8000, 10000, as long as d7<d8; preferably d7=3, and d8=1000; more preferably d7=5, and d8=100; still more preferably d7=5, and d8=80.

In these embodiments, inclusion of the CCSV-boosting base stock into the reference oil resulted in the increase of CCSV in the formulation compared to the reference oil, and a decrease of or maintenance of KV100 in the formulation compared to the reference oil, both are highly desired for formulating an engine oil having high energy efficiency.

In another embodiment, the following conditions (i), (ii), and (iii) are met:

$$d9 \leq D(kv) \leq d10, \quad (i)$$

where d9 and d10 can be, independently, 0.01, 0.05, 0.1, 0.5, 1, 2, 4, 5, 6, 8, 10, 12, 14, 15, 16, 18, 20, 22, 24, 25, as long as d9<d10; preferably d9=0.05, and d10=20; more preferably d9=0.1, and d10=10;

$$d11 \leq D(ccsv) \leq d12, \quad (ii)$$

where d11 and d12 can be, independently, 3, 4, 5, 6, 7, 8, 9, 10, 12, 14, 15, 16, 18, 20, 22, 24, 25, 26, 28, 30, 32, 34, 36, 38, 40, 45, 50, 55, 60, 65, 70, 75, 80, 85, 90, 95, 100, 200, 400, 500, 600, 800, 1000, 2000, 4000, 5000, 6000, 8000, 10000, as long as d11<d12; preferably d11=3, and d12=1000; more preferably d11=5, and d12=100; still more preferably D11=5, and d12=80; and $$r1 \leq D(ccsv)/D(kv), \quad (iii)$$

preferably but not necessarily D(ccsv)/D(kv)≤r2, where r1 and r2 can be, independently, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 500, 1000, 5000, 10,000, 50,000, as long as r1<r2. Preferably r1=5, more preferably r1=10. Preferably, r2=10,000, more preferably r2=1,000.

In these embodiments, inclusion of the CCSV-boosting base stock into the reference oil resulted in the increases of both CCSV and KV100 in the formulation compared to the reference oil. To achieve an engine oil having high energy efficiency, preferably meeting the classification requirements of SAE J300 for a grade therein, the ratio of D(ccsv)/D(kv) should be desirable high, i.e., at least 4, preferably at least 5, more preferably at least 10.

The CCSV-boosting base stock is preferably present in an amount sufficient for providing desired CCSV-boosting effect in the oil composition, while balancing other properties of the oil composition, particularly the KV100. The CCSV-boosting base stock can be present in the oil compositions of this disclosure in an amount from about c1 to c2 wt %, based on the total weight of the oil composition, where c1 and c2 can be, independently, 1, 2, 3, 4, 5, 6, 7, 8, 9, 10, 15, 20, 25, 30, 35, 40, 45, 50, as long as c1<c2. Preferably c1=2, and c2=30. More preferably c1=3, and c2=15. In general, it is desirable that the oil composition contains the CCSV-boosting base stock as a co-base stock.

Preferred oil compositions of the present disclosure containing the CCSV-boosting base stock exhibit a KV100 in a range from kv1 to kv2, where kv1 and kv2 can be 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, as long as kv1<kv2.

Engine oil lubricant grades are determined pursuant to SAE J300 specifications. The low temperature (W) grades (i.e., 10W-xx, 5W-xx, 0W-xx) are determined by the performance in a combination of viscosity tests including cold crank simulation (CCS) (ASTM D 5293) and low-temperature pumping viscosity (ASTM D 4684). The high temperature grading for an engine oil (i.e., XW-20, XW-30) is determined by kinematic viscosity at 100° C. (ASTM D 445) and high-temp high-shear viscosity (ASTM D 4683).

Advantageously, the use of a CCSV-boosting base stock of the present invention in an engine oil formulation can result in such oil having a particularly desirably low KV100, while maintaining an acceptable CCSV, both within the permitted ranges specified by the SAE J300 grade classifications.

Desirably, the oil composition of the present disclosure is an mW20 engine oil meeting the requirements of SAE J300, where m can be 0, 5, 10, 15, 20, 25, having a KV100 in the range from 5.6 to 7.4 cSt, preferably from 5.6 to 6.4 cSt.

Desirably, the oil composition of the present disclosure is an mW30 engine oil meeting the requirements of SAE J300, where m can be 0, 5, 10, 15, 20, 25, having a KV100 in the range from 9.3 to 10.9 cSt, preferably from 9.3 to 10.1 cSt.

Desirably, the oil composition of the present disclosure is an mW40 engine oil meeting the requirements of SAE J300, where m can be 0, 5, 10, 15, 20, 25, having a KV100 in the range from 12.5 to 14.4 cSt, preferably from 12.5 to 13.4 cSt.

A 5W-20 grade engine oil is allowed a KV100 range from 5.6 to 9.3 cSt. The fuel efficiency offered by the lubricant improves as the KV100 is reduced. In practice, however, it is difficult to approach the KV100 minimum of 5.6 cSt without simultaneously lowering the low temperature CCSV below the 5W limit (6200 centipoise at −35° C.) and into the 0W range. This is particularly true for engine oils that use high-quality Group III/IV base stocks that have very low CCSV. Therefore, conventional attempts to maximize the fuel efficiency of a 5W engine oil by minimizing the KV100 through the strategy of increasing the quantity of the high-quality Group III/IV base stock can result in reclassification of the modified oil as a 0W engine oil. Therefore, there is a practical limit to how low the viscosity of a 5W grade engine oil can be reduced before it is falls out of grade. Likewise, there is a fuel efficiency limit for 5W grade engine oil.

A CCSV-boosting base stock of the present disclosure described above can be used to increase or "boost" the low temperature CCSV of a formulation. Ideally, the CCSV-boosting base stock does not increase the high temperature KV100 viscosity relative to the rest of the engine oil formulation (i.e., the remainder of the oil absent the CCSV-boosting base stock). The incorporation of CCSV-boosting base stock of the present disclosure in an engine oil allows the formulation to minimize the high temperature viscosity while maintaining high enough CCSV to stay in grade.

The oil compositions of the present disclosure containing the CCSV-boosting base stock may advantageously exhibit a VI in the range from about 30 to about 200, preferably from about 35 to about 180, more preferably from about 40 to about 150.

The oil compositions of the present disclosure containing the CCSV-boosting base stock advantageously exhibit a NV value of no greater than 20%, preferably no greater than 18%, 16%, 15%, 14%, 12%, 10%, or even 8%.

The oil composition of the present disclosure (preferably a lubricating oil formulation) exhibits the abrupt and large viscosity change in a narrow temperature segment within the large temperature zone from 25 to −45° C. as described in connection with the CCSV-base stock of the present disclosure above. The earlier viscosity change behavior was described with respect to a binary mixture oil of a CCSV-boosting base stock of the present disclosure and PAO-4 as the reference oil. It is desirable and advantageous that when the PAO-4 is replaced by any reference oil described above, the mixture oil still exhibits the surprising viscosity change behavior at various shear rates, such as 0.1, 10, and 100 $s^{-1}$, and the viscosity change is also shear-rate dependent as described above.

Likewise, it is desirable that when the PAO-4 reference oils is replaced by any other reference oil described above, the mixture oil exhibits a curve on the DSC diagram in the vicinity of T1−5° C., just as described earlier in connection with the CCSV-boosting base stock.

The oil compositions of this disclosure are particularly advantageous as engine oil for internal combustion engines, including gas engines, diesel engines, natural gas engines, four-stroke engines, two-stroke engines, and rotary engines. The engine oil can be placed into the crank case of the engine to provide the necessary lubrication and cooling effect for the engine during normal operation. The low KV100, coupled with the CCSV of the oil enabled by the use of the CCSV-boosting base stock makes it particularly fuel efficient. The engine oils are particularly advantageous as passenger vehicle engine oil (PVEO) products.

While it is possible the oil composition of the present disclosure contains the CCSV-boosting base stock as a primary base stock, or even as a single base stock, it is preferable to include the CCSV-boosting base stock as a co-base stock in combination with one primary base stock and optionally one or more additional co-base stocks. In addition to the base stocks, the oil composition of the present disclosure may further comprise additive components.

III.2 Other Base Stocks Useful in the Lubricating Oil

A wide range of lubricating oil base stocks known in the art can be used in conjunction with the CCSV-boosting base stock in the lubricating oil formulations of the present disclosure, as primary base stock or co-base stock. Such other base stocks can be either derived from natural resources or synthetic, including un-refined, refined, or re-refined oils. Un-refined oil base stocks include shale oil obtained directly from retorting operations, petroleum oil obtained directly from primary distillation, and ester oil obtained directly from a natural source (such as plant matters and animal tissues) or directly from a chemical esterification process. Refined oil base stocks are those un-refined base stocks further subjected to one or more purification steps such as solvent extraction, secondary distillation, acid extraction, base extraction, filtration, and percolation to improve the at least one lubricating oil property. Re-refined oil base stocks are obtained by processes analogous to refined oils but using an oil that has been previously used as a feed stock.

API Groups I, II, III, IV and V are broad categories of base stocks developed and defined by the American Petroleum Institute (API Publication 1509; www.API.org) to create guidelines for lubricant base stocks. Group I base stocks generally have a viscosity index of from about 80 to 120 and contain greater than about 0.03% sulfur and less than about 90% saturates. Group II base stocks generally have a viscosity index of from about 80 to 120, and contain less than or equal to about 0.03% sulfur and greater than or equal to about 90% saturates. Group III base stocks generally have a viscosity index greater than about 120 and contains less than or equal to about 0.03% sulfur and greater than about 90% saturates. Group IV includes polyalphaolefins (PAO). Group V base stocks include base stocks not included in Groups I-IV. The table below summarizes properties of each of these five groups.

| Base Stock Properties | | | |
|---|---|---|---|
| | Saturates | Sulfur | Viscosity Index |
| Group I | Higher than 90 and/or | Higher than 0.03% and | At least 80 and at most 120 |
| Group II | Higher than 90 and | At most 0.03% and | At least 80 and at most 120 |
| Group III | At least 90 and | At most 0.03% and | At least 120 |
| Group IV | | PAO products | |
| Group V | All other products not included in Groups I, II, III, and IV | | |

Natural oils include animal oils (e.g., lard), vegetable oils (e.g., castor oil), and mineral oils. Animal and vegetable oils possessing favorable thermal oxidative stability can be used. Of the natural oils, mineral oils are preferred. Mineral oils vary widely as to their crude source, e.g., as to whether they are paraffinic, naphthenic, or mixed paraffinic-naphthenic. Oils derived from coal or shale are also useful in the present disclosure. Natural oils vary also as to the method used for their production and purification, e.g., their distillation range and whether they are straight run or cracked, hydrorefined, or solvent extracted.

Group II and/or Group III base stocks are generally hydroprocessed or hydrocracked base stocks derived from crude oil refining processes.

Synthetic base stocks include polymerized and interpolymerized olefins (e.g., polybutylenes, polypropylenes, propylene isobutylene copolymers, ethylene-olefin copolymers, and ethylene-alphaolefin copolymers).

Synthetic polyalphaolefins ("PAO") base stocks are placed into Group IV. Advantageous Group IV base stocks are those made from one or more of C6, C8, C10, C12, and C14 linear alpha-olefins ("LAO"s). These base stocks can be commercially available at a wide range of viscosity, such as a KV100 in the range from 1.0 to 1,000 cSt. The PAO base stocks can be made by polymerization of the LAO(s) in the presence of Lewis-acid type catalyst, in the presence of a metallocene compound-based catalyst system. High quality Group IV PAO commercial base stocks including the SpectraSyn™ and SpectraSyn Elite™ series available from ExxonMobil Chemical Company having an address at 4500 Bayway Drive, Baytown, Tex. 77450, United States.

All other synthetic base stocks, including but not limited to alkyl aromatics and synthetic esters are in Group V.

Esters in a minor amount may be useful in the lubricating oil formulations of this disclosure. Additive solvency and seal compatibility characteristics may be imparted by the use of esters such as the esters of dibasic acids with monoalkanols and the polyol esters of monocarboxylic acids. Esters of the former type include, e.g., the esters of dicarboxylic acids such as phthalic acid, succinic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, etc. Specific examples of these types of esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, etc. Useful ester-type Group V base stock include the Esterex™ series commercially available from ExxonMobil Chemical Company.

One or more of the following maybe used as a base stock in the lubricating oil of the present disclosure as well: (1) one or more Gas-to-Liquids (GTL) materials; and (2) hydrodewaxed, hydroisomerized, solvent dewaxed, or catalytically dewaxed base stocks derived from synthetic wax, natural wax, waxy feeds, slack waxes, gas oils, waxy fuels, hydrocracker bottoms, waxy raffinate, hydrocrackate, thermal crackates, foots oil, and waxy materials derived from coal liquefaction or shale oil. Such waxy feeds can be derived from mineral oils or non-mineral oil processing or can be synthetic (e.g., Fischer-Tropsch feed stocks). Such base stocks preferably comprise linear or branched hydrocarbyl compounds of C20 or higher, more preferably C30 or higher.

The lubricating oil formulations of the present disclosure can comprise one or more Group I, II, III, IV, or V base stocks in addition to the CCSV-boosting base stock. Preferably, Group I base stocks, if any, are present at a relatively low concentration if a high quality lubricating oil is desired. Group I base stocks may be introduced as a diluent of an additive package at a small quantity. Groups II and III base stocks can be included in the lubricating oil formulations of the present disclosure, but preferably only those with high quality, e.g., those having a VI from 100 to 120. Group IV and V base stocks, preferably those of high quality, are desirably included into the lubricating oil formulations of the present disclosure.

III.3 Lubricating Oil Additives

The formulated lubricating oil useful in the present disclosure may additionally contain one or more of the commonly used lubricating oil performance additives including but not limited to dispersants, detergents, viscosity modifiers, antiwear additives, corrosion inhibitors, rust inhibitors, metal deactivators, extreme pressure additives, anti-seizure agents, wax modifiers, viscosity modifiers, fluid-loss additives, seal compatibility agents, lubricity agents, anti-staining agents, chromophoric agents, defoamants, demulsifiers, densifiers, wetting agents, gelling agents, tackiness agents, colorants, and others. For a review of many commonly used additives and the quantities used, see: (i) Klamann in Lubricants and Related Products, Verlag Chemie, Deerfield Beach, Fla.; ISBN 0-89573-177-0; (ii) "Lubricant Additives," M. W. Ranney, published by Noyes Data Corporation of Parkridge, NJ (1973); (iii) "Synthetics, Mineral Oils, and Bio-Based Lubricants," Edited by L. R. Rudnick, CRC Taylor and Francis, 2006, ISBN 1-57444-723-8; (iv) "Lubrication Fundamentals", J. G. Wills, Marcel Dekker Inc., (New York, 1980); (v) Synthetic Lubricants and High-Performance Functional Fluids, 2nd Ed., Rudnick and Shubkin, Marcel Dekker Inc., (New York, 1999); and (vi) "Polyalphaolefins," L. R. Rudnick, Chemical Industries (Boca Raton, Fla., United States) (2006), 111 (Synthetics, Mineral Oils, and Bio-Based Lubricants), 3-36. Reference is also made to: (a) U.S. Pat. No. 7,704,930 B2; (b) U.S. Pat. No. 9,458,403 B2, Column 18, line 46 to Column 39, line 68; (c) U.S. Pat. No. 9,422,497 B2, Column 34, line 4 to Column 40, line 55; and (d) U.S. Pat. No. 8,048,833 B2, Column 17, line 48 to Column 27, line 12, the disclosures of which are incorporated herein in its entirety. These additives are commonly delivered with varying amounts of diluent oil that may range from 5 wt % to 50 wt % based on the total weight of the additive package before incorporation into the formulated oil. The additives useful in this disclosure do not have to be soluble in the lubricating oil formulations. Insoluble additives in oil can be dispersed in the lubricating oil formulations of this disclosure.

When lubricating oil formulations contain one or more of the additives discussed above, the additive(s) are blended into the oil composition in an amount sufficient for it to perform its intended function.

It is noted that many of the additives are shipped from the additive manufacturer as a concentrate, containing one or more additives together, with a certain amount of base oil diluents. Accordingly, the weight amounts in the table below, as well as other amounts mentioned herein, are directed to the amount of active ingredient (that is the non-diluent portion of the ingredient). The weight percent (wt %) indicated below is based on the total weight of the lubricating oil formulation.

Examples of techniques that can be employed to characterize the CCSV-boosting base stock described above include, but are not limited to, analytical gas chromatography, nuclear magnetic resonance, thermogravimetric analysis (TGA), inductively coupled plasma mass spectrometry, differential scanning calorimetry (DSC), and volatility and viscosity measurements.

The present invention is further illustrated by the following non-limiting examples.

EXAMPLES

In the following examples, including inventive and comparative examples, the candidate base stocks were evaluated for CCSV-boosting efficacy with respect to a commercial Group IV base stock as the reference oil using the methodology described above. The reference oil has a KV100 of about 4 and is called PAO-4 (SpectraSyn™ 4 from EMCC). Other commercial Group IV base stocks, such as PAO-6, PAO-8, PAO-40, and PAO-100 mentioned in the examples have KV100 in the vicinity of 6, 8, 40, and 100 cSt, respectively. CCSV-boosting efficacy of the candidate base stocks can be evaluated likewise with respect to PAO-6, PAO-8, PAO-40, and PAO-100, or any mixtures of two or more of PAO-4, PAO-6, PAO-8, PAO-40, and PAO-100, as reference oils. Due to the similarity among PAO-4, PAO-6, and PAO-8, it is probable that the candidate CCSV-boosting base stocks would demonstrate similar CCSV-boosting behavior with respect to PAO-6 and PAO-8, or any mixtures of two or more of PAO-4, PAO-6, and PAO-8. All CCSV values in the inventive and comparative examples were measured at −35° C. pursuant to ASTM D5583.

The neat PAO-4 base stock was measured for viscosity using a TA Instruments ARES-G2 rheometer machine equipped with a serrated parallel plate fixture of 25 mm in diameter under steady shear deformation. The machine is available from TA Instruments having an address at 159 Lukens Drive, New Castle, Del. 19720, U.S.A. The measurement was conducted under a cooling rate of 2° C./minute starting at 25° C. and ending at −90° C. Viscosity as a function of temperature data acquired at three shear rates (i.e., 0.1 s$^{-1}$, 10 s$^{-1}$, and 100 s$^{-1}$) are provided in FIG. 8a.

The neat PAO-4 base stock was run through a DSC scan using a TA Instrument Q200 differential scanning calorimeter, also available from TA Instruments. Sample was equilibrated at 25° C., then cooled down to −100° C., equilibrated at 100° C., and then heated to 25° C., both at the rate of 10° C./minute. The DSC curve is provided in FIG. 8b.

Figure 8A:
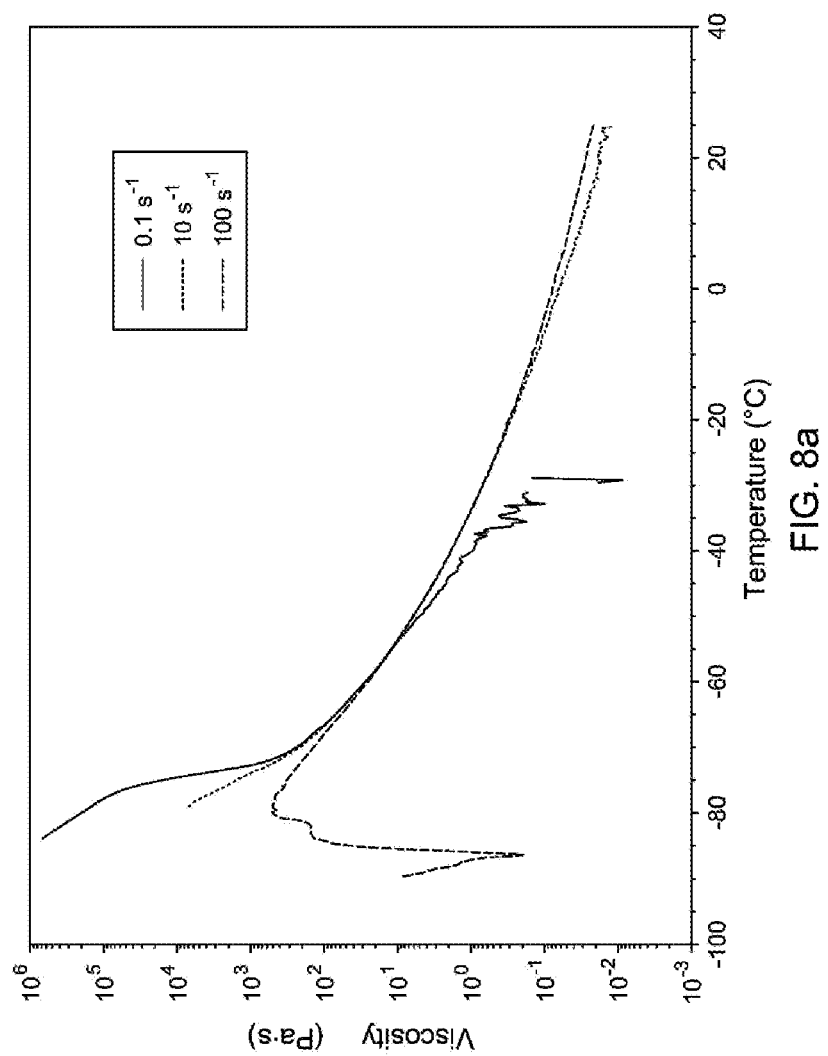
FIGS. 8a and 8b are a diagram showing viscosity as a function of temperature at various shear rates and a DSC curve of a PAO-4 reference oil, respectively.
Figure 8B:
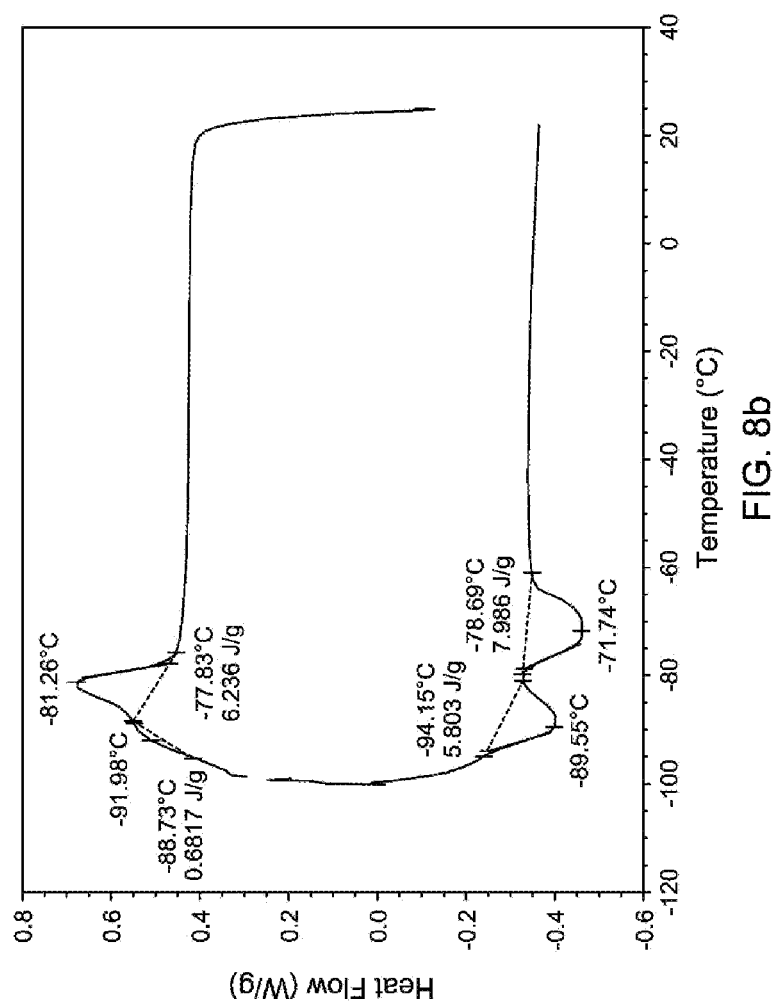

As can be seen from FIGS. 8a and 8b, the PAO-4 reference oil exhibited substantial viscosity increase when the temperature was reduced gradually from 25° C. to −40° C. However, such viscosity increase was largely smooth; no steep cliff was observed at all three shear rates, especially at the two higher shear rates. Also, it can be seen that when the shear rate decreased from $10 \text{ s}^{-1}$ to $0.1 \text{ s}^{-1}$, the two viscosity curves are almost identical in the temperature range from −40 to 25° C. Thus the viscosity change is largely unaffected by shear rate. The total change of viscosity in any 10° C. segment within the large −40 to 25° C. zone was not over one order of magnitude. This corresponds to the lack of any peak on the DSC curve in the temperature range from −40 to 25° C. This shows that no phase separation or phase change occurs in PAO-4 in the −40 to 25° C. temperature zone.

Example 1: Mono-Methyl Paraffins as CCSV-Boosting Base Stocks shear rate; by about 2 orders of magnitude at $10 \text{ s}^{-1}$ shear rate, and by about 1 order of magnitude at $100 \text{ s}^{-1}$ shear rate. Clearly the higher the shear rate, the lower the viscosity increase was.

Figure 9A:
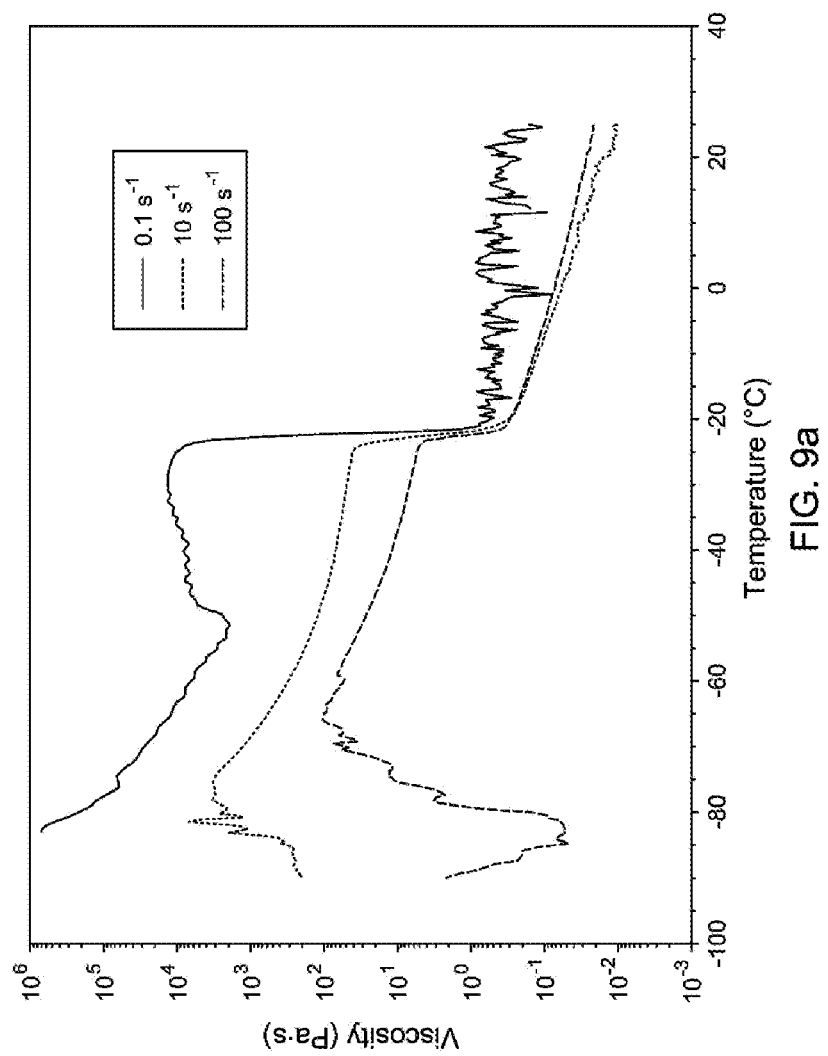
FIGS. 9a and 9b are a diagram showing viscosity as a function of temperature at various shear rates of a mixture oil consisting of the PAO-4 reference oil of FIGS. 8a and 8b and a C28 mono-methyl paraffin CCSV-boosting base stock, and a DSC curve of the mixture oil, respectively.
Figure 9B:
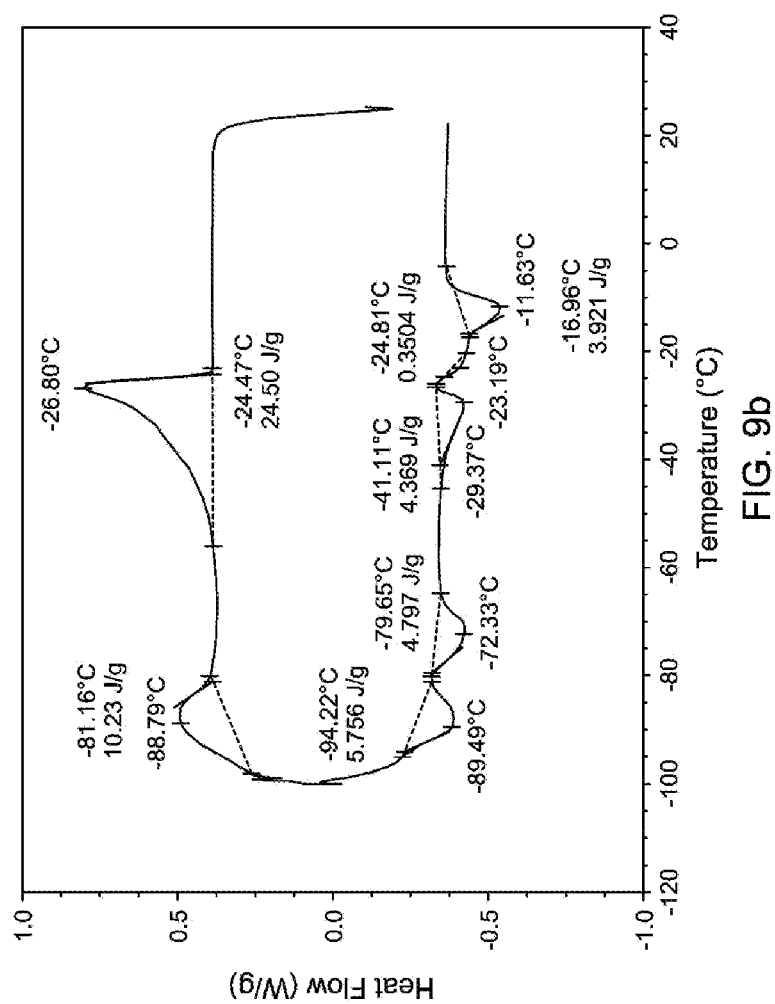

As can be seen from FIG. 9b, in the DSC curve, also in the vicinity of 26.80° C., a temperature close to the temperature where viscosity hike occurs in FIG. 9a, a large peak was recorded. FIGS. 9a and 9b taken together suggest that a phase transition occurred around the temperature 25° C. Given that in FIGS. 8a and 8b no such viscosity hike or DSC peak were observed in the neat PAO-4 reference oil, one can reasonably deduce that the C28 mPAO hydrocarbon underwent the phase change or phase separation in the mixture oil. The phase change or separation caused the dramatic viscosity change in FIG. 9a and the heat flow peak in FIG. 9b. At low shear rate of $0.1 \text{ s}^{-1}$, because the phase-separated material has sufficient time to congregate to form large bodies of material with high viscosity, the viscosity increase is very large. At high shear rate of $100 \text{ s}^{-1}$; however, the phase-separated material has less time and smaller chances to form large bodies and is therefore more evenly distributed or partly solubilized due to the mechanical shear, resulting in a less dramatic, but nonetheless still significant viscosity increase. This very interesting phenomenon underlies the efficacy of the C28 mono-methyl paraffin as a CCSV-boosting base stock with respect to PAO-4 as a reference oil.

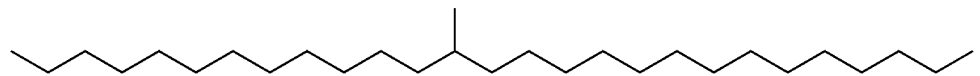

Pure 1-tetradecene was dimerized in a continuous stirred-tank reactor in the presence of a metallocene catalyst system comprising biscylopentadienyl zirconium (IV) dichloride and methyl aluminoxane (MAO). MAO served as both a scavenger and a co-catalyst in the process. The catalyst system was dissolved in toluene before being charged into the reactor. Residence time was 6 hours at a reaction temperature of about 70° C. The reaction mixture effluent from the reactor was quenched by using a small quantity of water. Filter aid was added thereafter, and the fluid was filtered to remove Zr and/or Al-containing solid particles. Gas chromatography showed a conversion of the C14 LAO higher than 50%, and a selectivity toward dimers higher than 95%. The resultant unsaturated PAO was then flashed to remove the residual monomer. The unsaturated dimer product was then hydrogenated by reacting with hydrogen in the presence of a hydrogenation catalyst to obtain a base stock comprising the C28 mono-methyl olefin as a primary component. This base stock has a KV100 of 3.57 cSt, a KV40 of 12.8 cSt, a VI of 175, a NV of 10.5%, a pour point of 18° C., and a solid appearance at 25° C. Efficacy of the C28 mono-methyl paraffin as a CCSV-boosting base stock was evaluated and the evaluation result is provided in FIG. 2.

A mixture oil consisting of 10 wt % of the C28 mono-methyl paraffin and 90 wt % of the PAO-4 reference oil was measured for viscosity and run through DSC scan using identical instruments under identical measurement conditions to those for the neat PAO-4 reference oil, described above. The viscosity-temperature diagram at three shear rates (0.1, 10 and $100 \text{ s}^{-1}$, respectively) and the DSC curve are provided in FIGS. 9a and 9b, respectively.

As can be clearly seen from FIG. 9a, in all three viscosity-temperature curves, the mixture oil demonstrated a very steep viscosity increase when temperature decreased from about −20° C. In a very narrow temperature segment, from about −20 to about −25° C., viscosity of the mixture oil increased by more than 4 orders of magnitude at $0.1 \text{ s}^{-1}$ Example 2: Lewis Acid Catalyzed, Hydrogenated Dimers of C16 and C18 LAOs as CCSV-Boosting Base Stock A series of hydrocarbon materials were made from single, pure LAO monomers, using BF3 as the polymerization catalyst ethanol as a promoter, and ethyl acetate as terminator with a promoter/terminator ratio of 1, a polymerization temperature of 50° C., in a two-tank continuous stirred tank reactor with a residence time of 2 hours in the first tank and 1 hour in the second tank, substantially in accordance with the method taught in WO2006/101585 A1, mutatis mutandis. To the extent the dimers were made by using a conventional, non-metallocene catalyst, they are called conventional PAOs ("cPAO"s). The polymerization mixtures exiting the second tank were flashed to remove residual monomers to obtain unsaturated products comprising about 90 wt % dimers and about 10 wt % trimers. The unsaturated products were then hydrogenated by hydrogen in the presence of a hydrogenation catalyst to obtain substantially saturated hydrocarbon base stocks. Properties of C32 and C36 dimers made from C16 and C18 LAOs in this manner are provided in Table 1 below.

TABLE 1

| Properties | C32 cPAO | C36 cPAO |
|---|---|---|
| KV100 (cSt) | 4.48 | 5.47 |
| KV40 (cSt) | 19.21 | 24.7 |
| VI | 153 | 167 |
| NV (%) | 6.48 | 5.31 |
| Pour Point (° C.) | −15 | 0 |
| Appearance at 25° C. | Liquid | Liquid |

Figure 2:
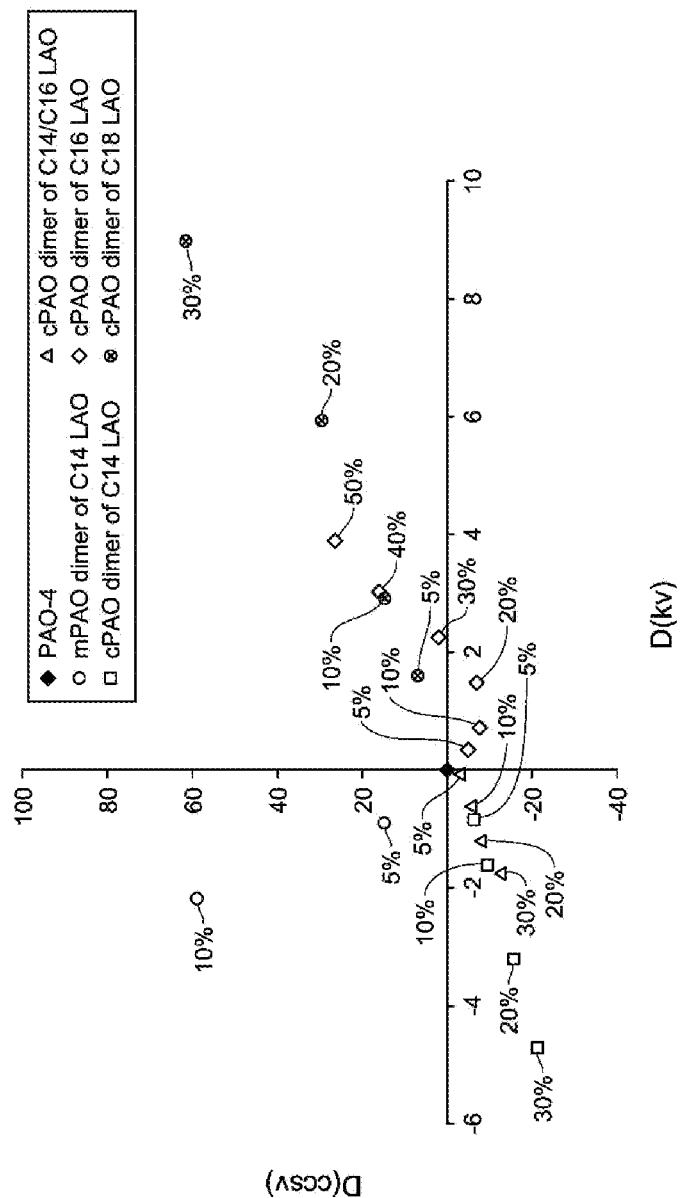
FIG. 2 is a diagram showing CCSV-boosting efficacies of metallocene-catalyzed and conventionally catalyzed dimers of various linear alpha olefins with respect to PAO-4 as a reference oil.

Efficacies of a series of cPAO dimers as candidate CCSV-boosting base stocks were evaluated and the evaluation results are provided in FIG. 2.

FIG. 2 shows that the metallocene-catalyzed C28 dimer of C14 LAO (also called C28 mono-methyl paraffin) prepared in Example 1 displayed excellent efficacy as a CCSV boosting base stock. For example, at a 10 wt % treat rate with PAO-4, it generated a D(ccsv) of 60 and a D(kv) of about −2. By comparison, a C28 cPAO dimer made from C14 LAO using BF3 as the catalyst was shown to be not a CCSV booster at any treat rate. Notably, the C28 cPAO dimer is more highly branched than the C14 mPAO dimer due to isomerization during oligomerization. Accordingly, for base stocks of nearly the same molecular weight and carbon number, a base stock with the more linear molecular structure appear to have the higher CCSV boosting efficacy.

FIG. 2 also shows that cPAO dimers of longer-chain LAOs, such as the C32 and C36 hydrocarbons made from dimerization of C16 and C18 LAOs, can have the desired CCSV-boosting efficacy at various treat rates. For example, the C32 hydrocarbon made from C16 LAO achieved CCSV-boosting effect at 40 wt % treat-rate and above, and the C36 hydrocarbon made from the C18 LAO achieved CCSV-boosting effect at 5 wt % treat-rate and above.

A mixture oil consisting of 10 wt % of the C36 hydrocarbon made by dimerization of C18 linear alpha olefin and 90 wt % of the PAO-4 reference oil was measured for viscosity and run through DSC scan using identical instruments under identical measurement conditions to those for the neat PAO-4 reference oil, described above. The viscosity-temperature diagram at three shear rates (0.1, 10 and 100 $s^{-1}$, respectively) and the DSC curve are provided in FIGS. 10a and 10b, respectively.

Figure 10A:
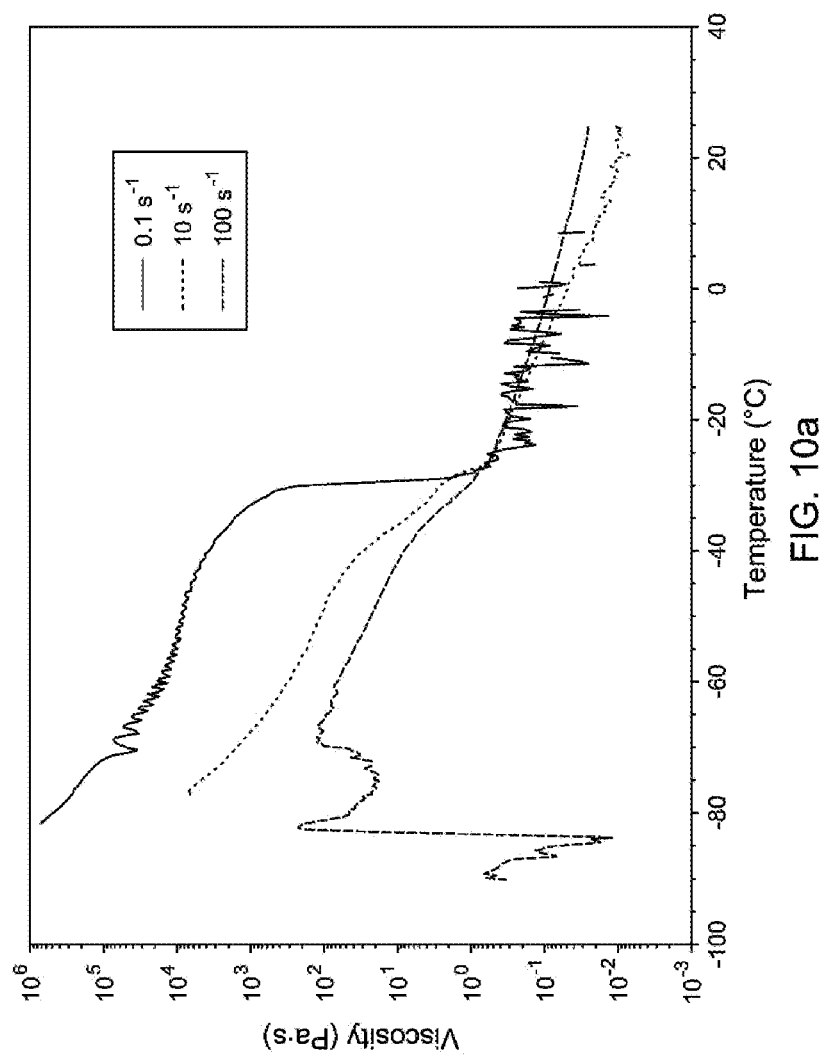
FIGS. 10a and 10b are a diagram showing viscosity as a function of temperature at various shear rates of a mixture oil consisting of the PAO-4 reference oil of FIGS. 8a and 8b and a C36 cPAO CCSV-boosting base stock, and a DSC curve of the mixture oil, respectively.

As can be clearly seen from FIG. 10a, in all three viscosity-temperature curves, the mixture oil demonstrated significant viscosity increase when temperature decreased from about −28° C. to about −35° C. In this very narrow temperature segment, viscosity of the mixture oil increased dramatically—by more than 3 orders of magnitude at 0.1 $s^{-1}$ shear rate; by about 1.5 orders of magnitude at 10 $s^{-1}$ shear rate, and by about 0.8 order of magnitude at 100 $s^{-1}$ shear rate. Clearly the higher the shear rate, the lower the viscosity increase was.

Figure 10B:
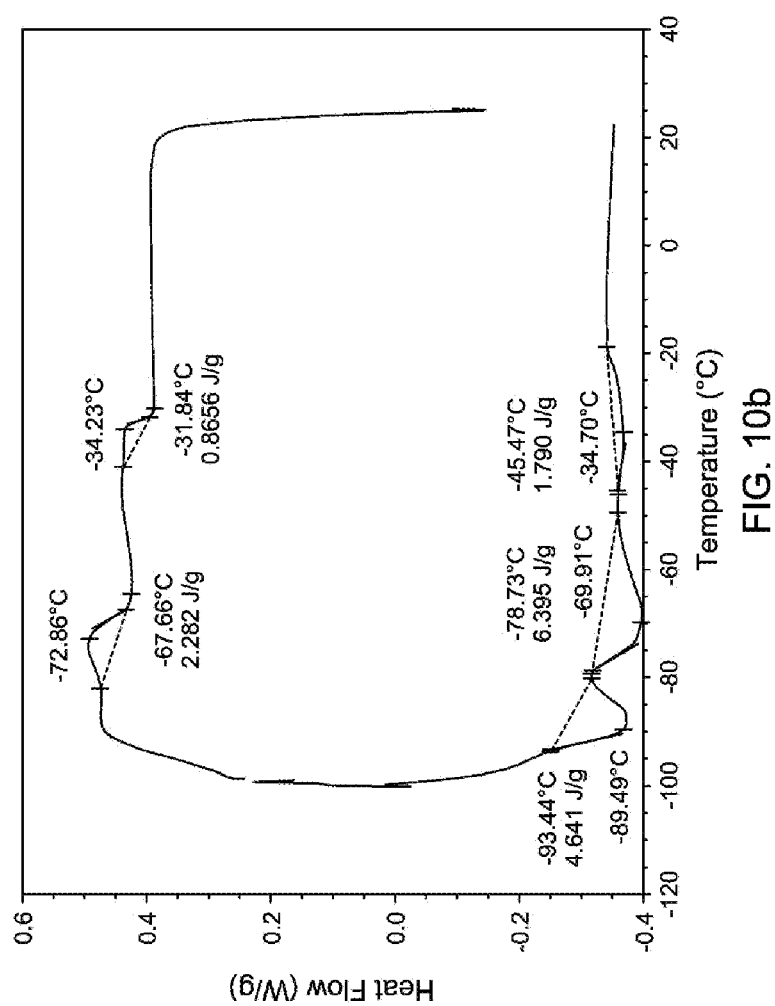

As can be seen from FIG. 10b, in the DSC curve, there is a visible peak in the vicinity of −34.23° C. when the mixture oil was being cooled down, and a visible peak in the vicinity of −34.70° C. when the mixture oil was being heated up. These correspond well with the temperature zone in the viscosity curve in FIG. 10a where the steep viscosity increase occurred. Taken together, FIGS. 10a and 10b suggest that a phase separation occurred in the mixture oil in the temperature zone from −28° C. to −40° C. Given that in FIGS. 8a and 8b no such viscosity hike or DSC peak were shown in the neat PAO-4 reference oil, one can reasonably deduce that the C36 cPAO hydrocarbon underwent a phase change or phase separation in the mixture oil. The phase change or separation caused the dramatic viscosity change in FIG. 10a and the corresponding heat flow peak in FIG. 10b. This very interesting phenomenon underlies the efficacy of the C36 cPAO dimer as a CCSV-boosting base stock with respect to PAO-4 as a reference oil. A comparison of the viscosity curves in FIG. 9a and FIG. 10a appears to show that the C28 mono-methyl paraffin in Example 1 is more effective than the C36 cPAO dimer in this Example 2 as a CCSV-boosting base stock with respect to PAO-4 as a reference oil.

Example 3: Waxy Esters as CCSV-Boosting Base Stocks

A series of linear, synthetic mono-ester base stocks were prepared by the condensation reaction of linear fatty acids (C10-C18 linear carboxylic acids) and linear primary alcohols (C6-C18 linear primary alcohols). Preferably, the ester has 26 carbons and is prepared from palmitic acid (C16) and n-decanol (C10) to make decyl palmitate. Properties of illustrative linear, synthetic mono-ester base stocks (i.e., decyl palmitate, dodecyl palmitate, decyl stearate, and dodecyl stearate) are shown in Table 2 below.

TABLE 2

| Properties | n-C10 Palmitate | n-C12 Palmitate | n-C10 Stearate | n-C12 Stearate |
|---|---|---|---|---|
| KV100 (cSt) | 3.14 | 3.59 | 3.64 | 4.18 |
| KV40 (cSt) | Solid | Solid | Solid | Solid |
| VI | — | — | — | — |
| NV (%) | — | — | — | — |
| Pour Point (° C.) | >40 | >40 | >40 | >40 |
| Appearance at 25° C. | Solid | Solid | Solid | Solid |

Figure 3:
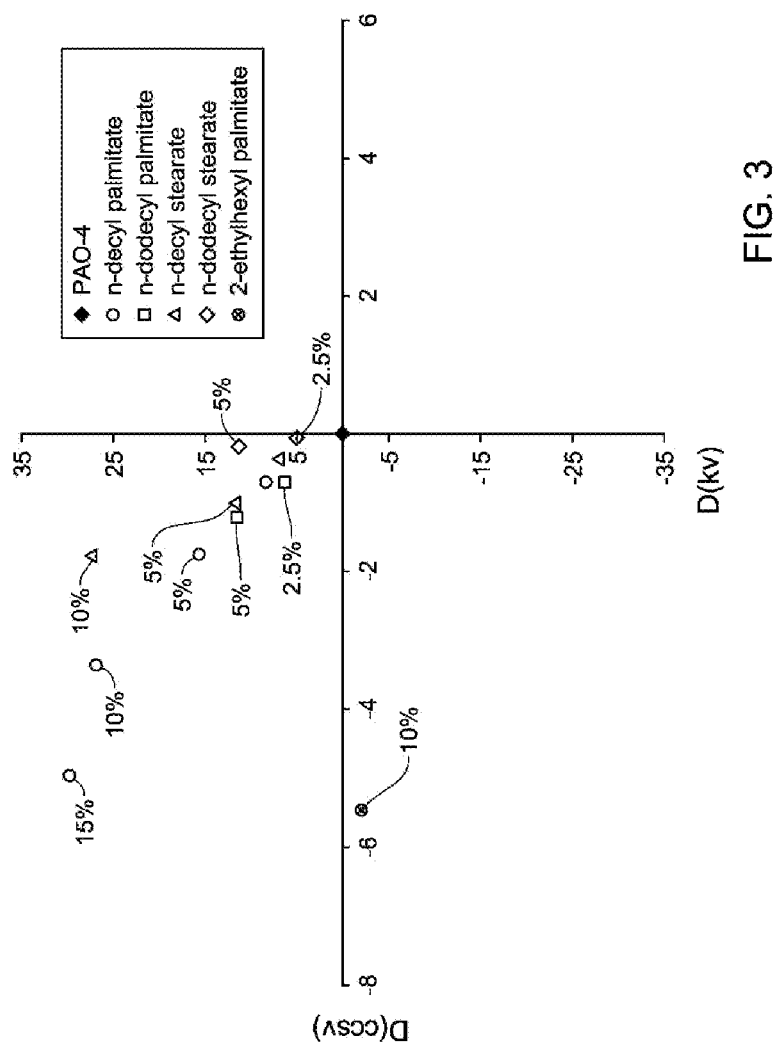
FIG. 3 is a diagram showing CCSV-boosting efficacies of a series of waxy mono-esters with respect to PAO-4 as a reference oil.

FIG. 3 graphically shows CCSV-boosting efficacies of a series of waxy esters. As can be seen, the base stocks listed in Table 2 above generated a positive D(ccsv) and a negative D(kv), both highly desired for a CCSV-boosting base stock of the present disclosure. By contrast, an ester made from a linear carboxylic acid and a branched alcohol, such as 2-ethylhexyl palmitate, resulted in a negative D(ccsv), hence not a CCSV-boosting base stock with respect to PAO-4 reference oil. One can clearly see the impact of substitution on the long chain on the CCSV-boosting effect of such mono-esters.

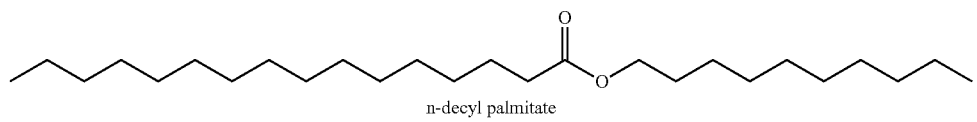

n-decyl palmitate

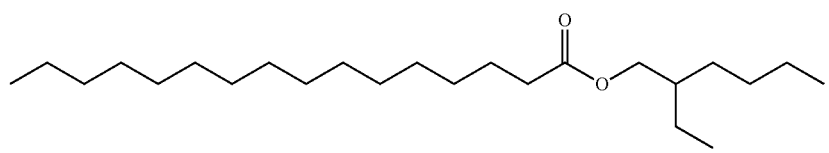

2-ethylhexyl palmitate

A mixture oil consisting of 10 wt % of the n-decyl palmitate and 90 wt % of the PAO-4 reference oil was measured for viscosity and run through DSC scan using identical instruments under identical measurement conditions to those for the neat PAO-4 reference oil, described above. The viscosity-temperature diagram at three shear rates (0.1, 10 and 100 $s^{-1}$, respectively) and the DSC curve are provided in FIGS. 11a and 11b, respectively.

Figure 11A:
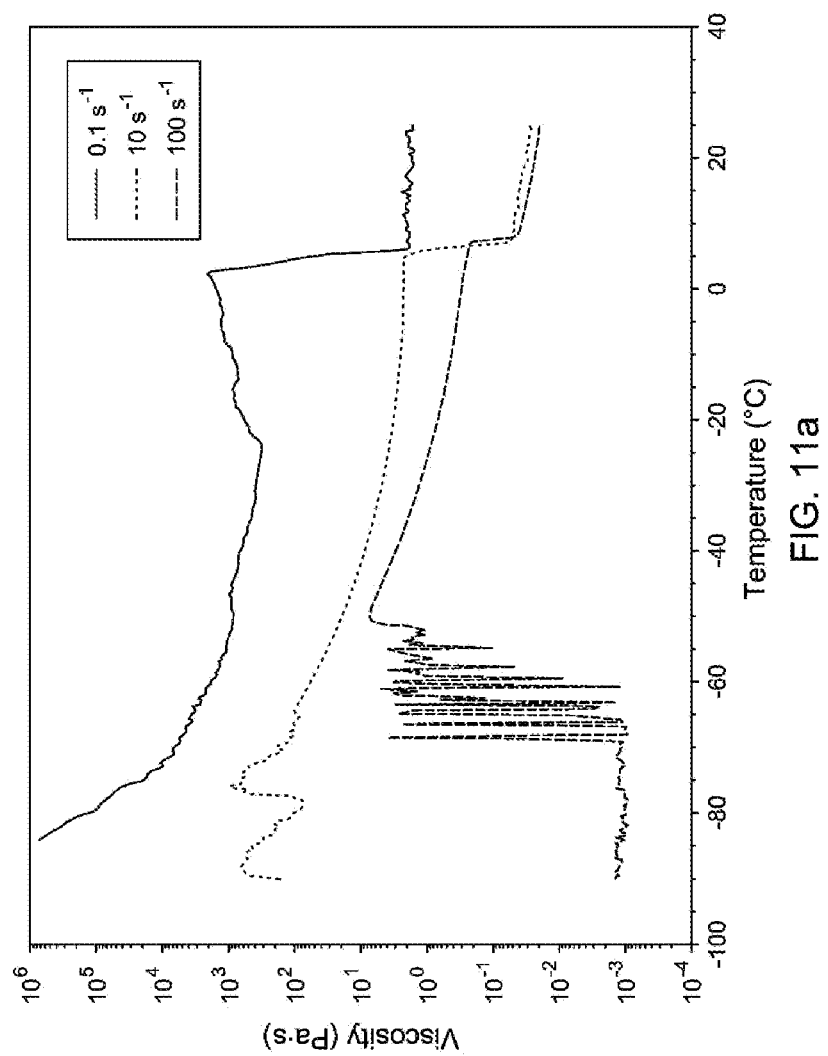
FIGS. 11a and 11b are a diagram showing viscosity as a function of temperature at various shear rates of a mixture oil consisting of the PAO-4 reference oil of FIGS. 8a and 8b and an n-decyl palmitate CCSV-boosting base stock, and a DSC curve of the mixture oil, respectively.

As can be clearly seen from FIG. 11a, in all three viscosity-temperature curves, the mixture oil demonstrated a very steep viscosity increase when temperature decreased from about 8° C. to about 5° C. In this very narrow temperature segment, viscosity of the mixture oil increased by about 3 orders of magnitude at 0.1 $s^{-1}$ shear rate; by about 1.5 orders of magnitude at 10 $s^{-1}$ shear rate, and by about 1 order of magnitude at 100 $s^{-1}$ shear rate. Clearly the higher the shear rate, the lower the viscosity increase is.

Figure 11B:
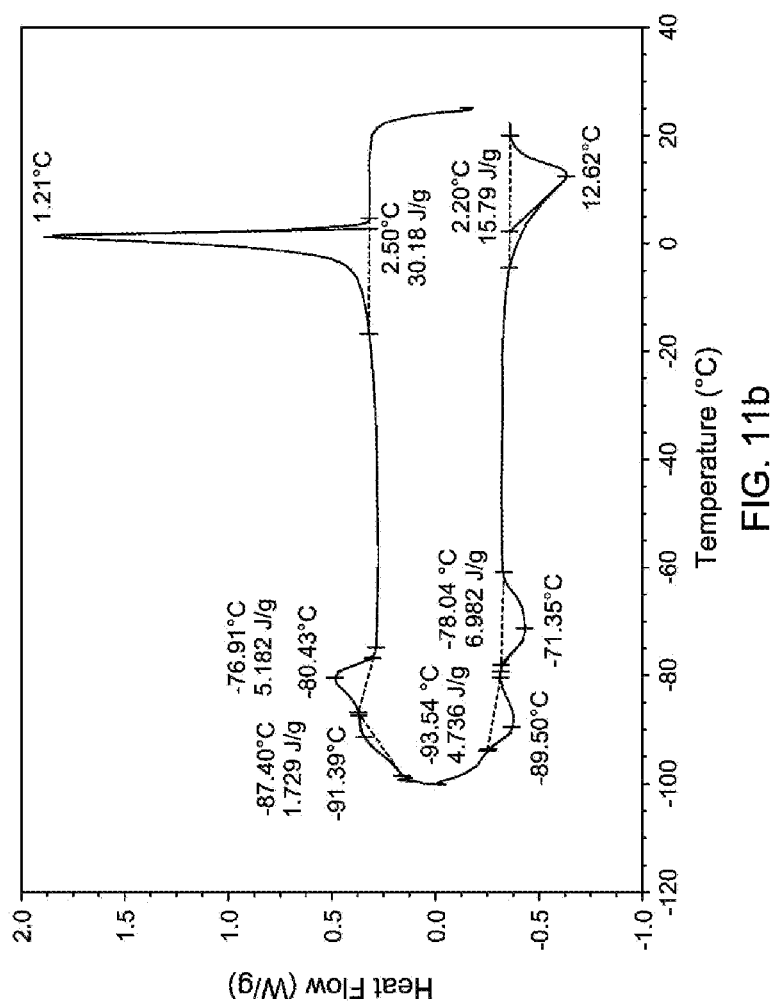

As can be seen from FIG. 11b, in the DSC curve, also in the vicinity of 1.21° C., a temperature close to the temperature where viscosity hikes occur in FIG. 11a, a large peak was recorded. FIGS. 11a and 11b taken together suggest that a phase transition occurred in the vicinity of 1 to 8° C. Given that in FIGS. 8a and 8b no such viscosity hike or DSC curve are shown in the neat PAO-4 reference oil, one can reasonably deduce that the linear ester underwent the phase change or phase separation in the mixture oil. The phase change or separation caused the dramatic viscosity change in FIG. 11a and the corresponding heat flow peak in FIG. 11b. This very interesting phenomenon underlies the efficacy of the linear ester as a CCSV-boosting base stock with respect to PAO-4 as the reference oil.

Example 4: Dialkyl Carbonates as CCSV-Boosting Base Stocks

Dialkyl carbonates with linear alkyl groups were prepared by reacting dimethyl carbonate, diethyl carbonate, phosgene, or sodium carbonate with at least two equivalents of alcohol. The alcohols can range from C1 to C24 alcohols. Preferably, the dialkyl carbonate contains from 18 to 40 carbons and the alkyl chains should be linear with no branching. A specific example of the dialkyl carbonate is di-n-dodecylcarbonate. Properties of di-n-dodecylcarbonate (formula shown below) include: a KV100 of 3.38, a KV40 of 12.0, a VI of 167, a NV of 14.4%, and an appearance of solid/liquid at ambient temperature.

Figure 4:
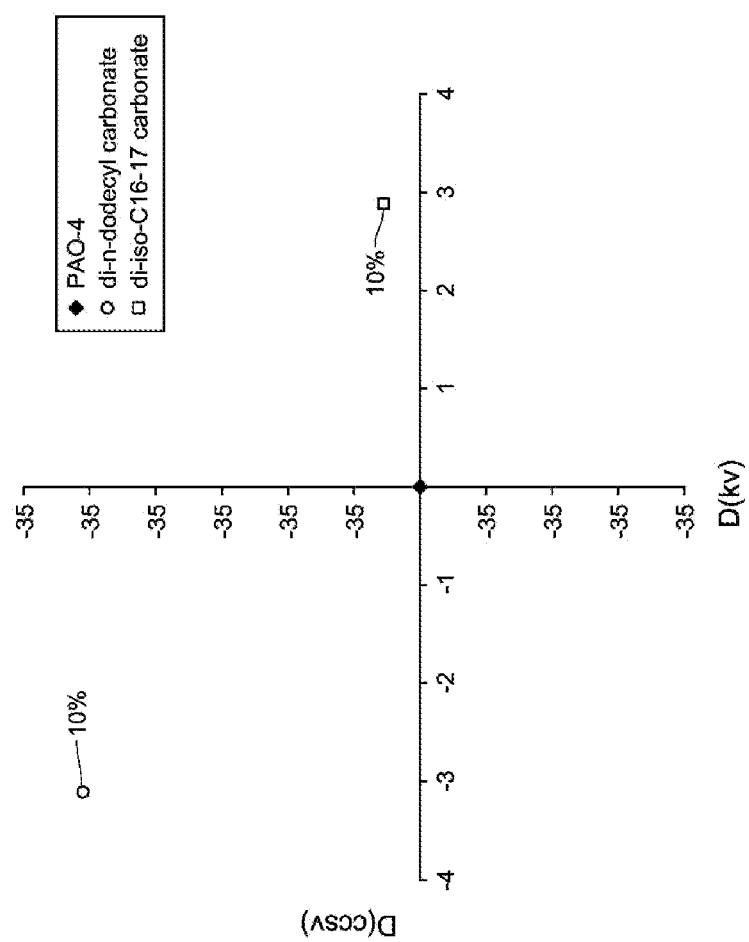
FIG. 4 is a diagram showing CCSV-boosting efficacies of a series of tertiary amides with respect to PAO-4 as a reference oil.

FIG. 4 graphically shows CCSV-boosting efficacies of dialkyl carbonates evaluated pursuant to the methodology described above. These base stocks generated a positive D(ccsv) and a negative D(kv), and therefore are good CCSV-boosting base stocks. By contrast, a carbonate made from branched iso-C16/C17 alcohols generated a D(ccsv) >0, a D(kv)>0, but with a D(ccsv)/D(kv)<4.0, and hence, not a CCSV-boosting base stock in the meaning of the present disclosure. Again this clearly demonstrates the significance of substitution on the long chain on the CCSV-boosting efficacy of the candidate base stock.

Example 5 Tertiary Amides as CCSV-Boosting Base Stocks

Tertiary amide base stocks were prepared by reacting linear C12-C18 linear fatty acid or fatty acid derivative thereof, such as fatty acid ester or fatty acid chloride, with a secondary amine to form a tertiary amide. Properties of N,N-dibutylpalmamide and N,N-dibutylstearamide, two CCSV-boosting base stocks, are shown in Table 3 below.

TABLE 3

| Properties | N,N-dibutylpalmamide | N,N-dibutylstearamide |
|---|---|---|
| KV100 (cSt) | 3.67 | 4.17 |
| KV40 (cSt) | 16.4 | 19.3 |
| VI | 108 | 120 |
| NV (%) | 16.0 | — |
| Pour Point (° C.) | — | — |
| Appearance at 25° C. | Liquid | Solid |

Figure 5:
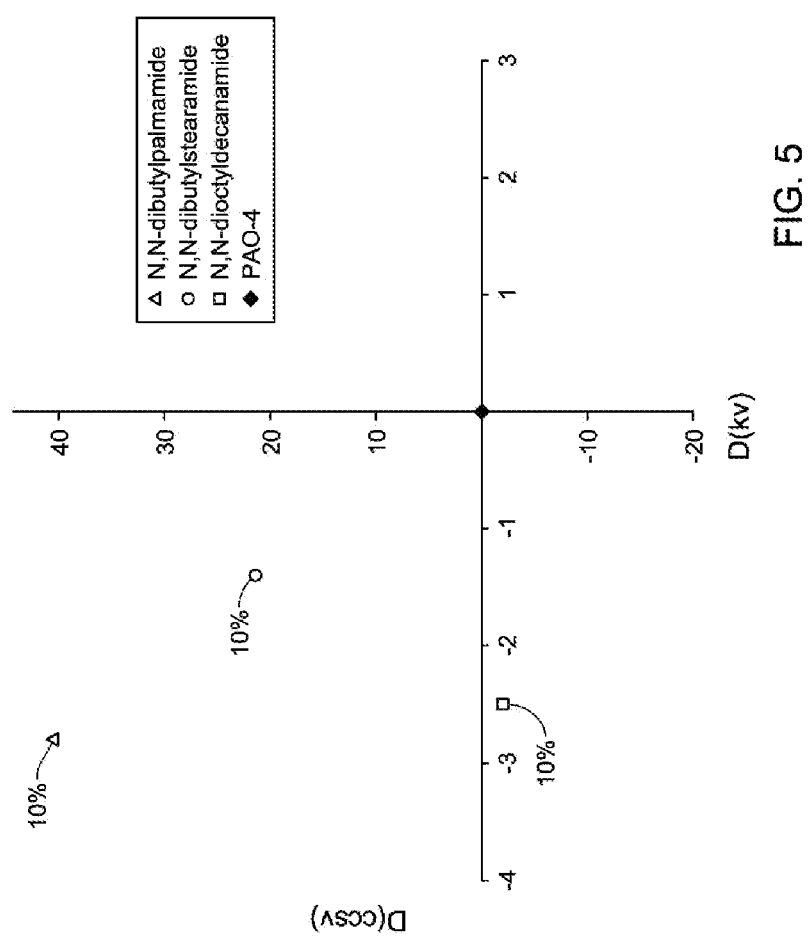
FIG. 5 is a diagram showing CCSV-boosting efficacies of a series of dialkyl carbonates with respect to PAO-4 as a reference oil.
Figure 6:
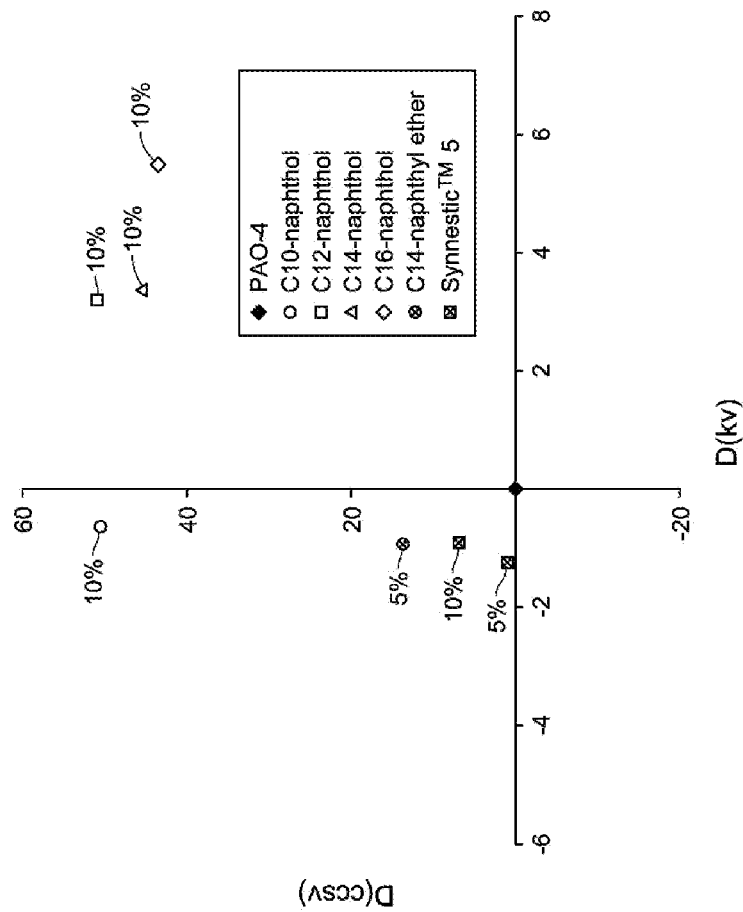
FIG. 6 is a diagram showing CCSV-boosting efficacies of a series of carbon-alkylated naphthols and a series of alkyl naphthyl ethers with respect to PAO-4 as a reference oil.

FIG. 5 graphically shows CCSV-boosting efficacies of a series of amides with respect to PAO-4 as the reference oil. Tertiary amides of a linear long-chain fatty acid, such as palmitic acid or stearic acid, and a secondary amine substituted by two relatively short linear alkyl groups, such as dibutylamine, showed good CCSV-boosting efficacy. By contrast, N,N-dioctyldecanamide showed no CCSV-boosting effect. Notably, N,N-dibutylstearamide and N,N-dioctyldecanamide have the same molecular weight and similar structural elements. Despite this, N,N-dibutylstearamide demonstrated higher CCSV-boosting efficacy, presumably because it possesses a longer, uninterrupted section of linear chain including a longer, linear, uninterrupted C18 hydrocarbon backbone than N,N-dioctyldecanamide.

di-n-dodecylcarbonate

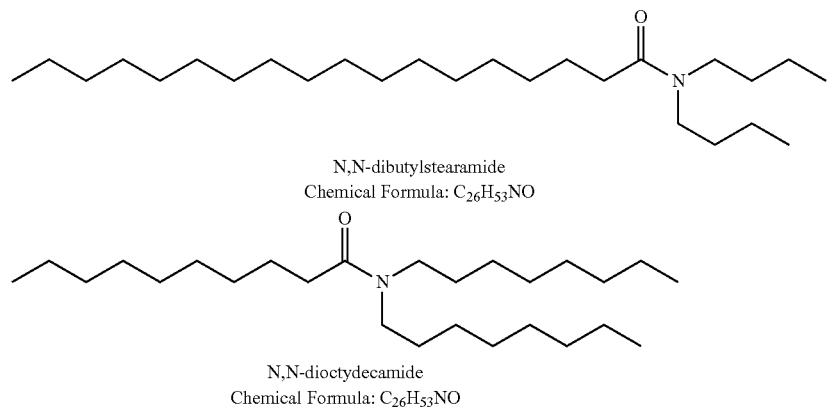
N,N-dibutylstearamide
Chemical Formula: $C_{26}H_{53}NO$

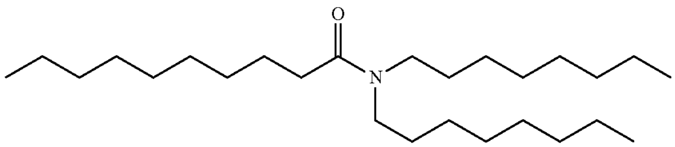

N,N-dioctydecamide
Chemical Formula: $C_{26}H_{53}NO$

Example 6: Carbon-Alkylated Naphthols as CCSV-Boosting Base Stocks

Carbon-alkylated naphthol base stocks were prepared by reacting naphthols with linear alpha olefin by an acid catalyst. Preferably, the CCSV-boosting alkylated naphthol was prepared from alkylating 2-naphthol with C10 LAO to form a primarily mono-alkylated naphthol product. It is believed that the presence of the un-alkylated hydroxyl group (—OH) connected to the naphthyl ring together with long alkyl group connected on the ring renders the CCSV-boosting effect of this family of base stock materials. This class of CCSV boosters has very low VI. Properties of a series of carbon-alkylated naphthol base stocks (i.e., C10-naphthol, C12-naphthol, C14-naphthol and C16-naphthol) are shown in Table 4 below. They were evaluated for CCSV-boosting efficacy with respect to PAO-4 as the reference oil. Results are shown in FIG. 6. The linear C10-naphthol exemplifies a preferred embodiment of the CCSV-boosting base stock because it generated large, positive D(ccsv) and a negative D(kv) of about −1, both highly desirable for a CCSV-boosting base stock. Linear long-chain alkyl naphthols (including linear C12-, C14-, and C16-naphthols) as prepared in Example 6 were also shown to have CCSV-boosting efficacy. Particularly, these aromatic alcohols generate a D(ccsv)>0, and a D(ccsv)/D(kv)>4.0.

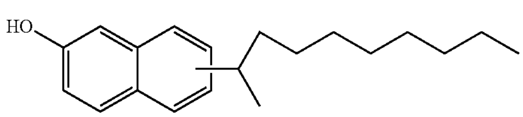

(C10-naphthol)

TABLE 4

| Properties | C10-naphthol | C12-naphthol | C14-naphthol | C16-Naphthol |
|---|---|---|---|---|
| KV100 (cSt) | 11.2 | 10.4 | 10.8 | 11.9 |
| KV40 (cSt) | 340.5 | 231.7 | 210.1 | 198 |
| VI | −196 | −103 | −56 | 1 |
| NV (%) | — | — | 11.0 | — |
| Pour Point (° C.) | −18 | — | −27 | — |
| Appearance at 25° C. | Liquid | Liquid | Liquid | Liquid |

Example 7: Naphthyl Ethers as CCSV-Boosting Base Stocks

Aromatic ether base stocks were prepared by reacting 2-naphthol with alkylating agents having a linear alkyl group, such as alkylhalides. A majority of the products were only O-alkylated (e.g., forming a naphthyl ether but without alkylating the naphthyl ring). Approximately 10-20% of the product also bear a long chain alkyl group directly connected with the naphthyl ring, i.e., C-alkylated. Properties of a C14-naphthyl ether include a KV100 of 4.1, a solid appearance at 40° C., a pour point higher than 40° C., and a solid appearance at ambient temperature.

FIG. 6 graphically shows CCSV-boosting efficacies of carbon-alkylated naphthols (aromatic alcohols) of Example 6 and alkyl naphthyl ethers (aromatic ethers) of this example. The C-14 naphthyl ether is a CCSV-boosting base stock in that it generated a positive D(ccsv) and a negative D(kv).

In comparison, a linear long-chain alkyl naphthalene base stock, Synnestic™ 5 available from ExxonMobil Chemical Company, showed some but much weaker CCSV-boosting efficacy compared to the linear long-chain naphthols and the linear long-chain naphthyl ethers, especially at low concentrations such as 5 wt %. At 5 wt % and 10 wt % treat rates, Synnestic™ 5 caused D(ccsv) of only less than 5 and 10, respectively. On the other hand, at 10 wt %, the C10-naphthol, C12-naphthol, C14-naphthol, and C16-naphthol all demonstrated a D(ccsv) of over 40. Even the C14-naphthol ether demonstrated a D(ccsv) of about 15 at 5 wt % treat rate.

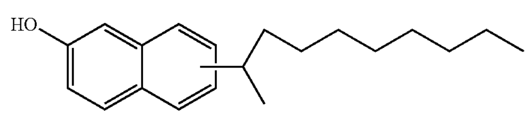

$C_{10}$-naphthol

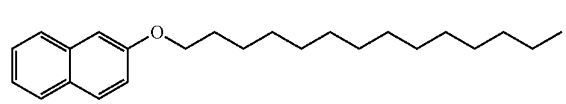

C14-naphthyl ether

-continued

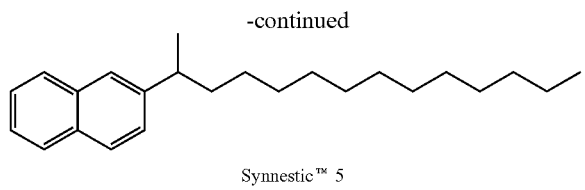

Synnestic™ 5

Example 7 (Comparative Example)

Figure 7:
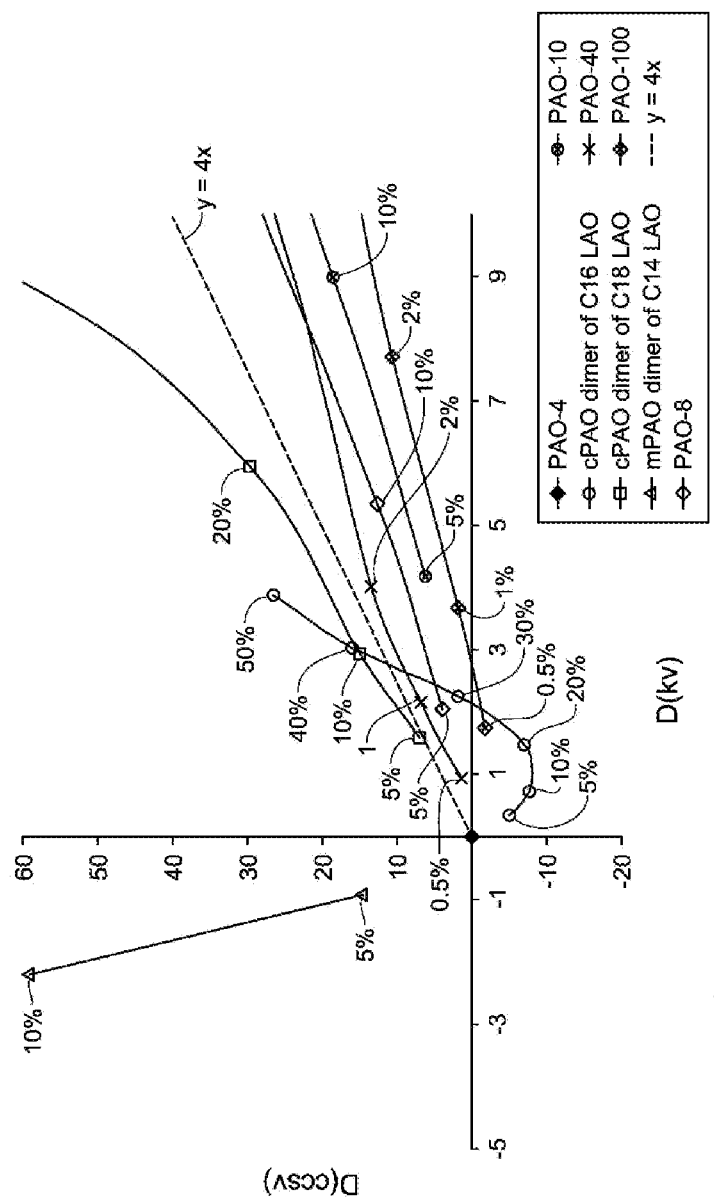
FIG. 7 is a diagram showing the effect of a series of Group IV base stocks on the CCSV of binary blends of these Group IV base stocks and a PAO-4 base stock.

A series of commercial Group IV PAO base stocks (PAO-8, PAO-10, PAO-40, PAO-100, which are commercial Group IV base stocks having a KV100 of about 8, 10, 40, and 100 cSt, respectively) were evaluated for their potential CCSV-boosting efficacy with respect to PAO-4 as a reference oil by using the methodology discussed above. Results are shown in FIG. 7. To obtain a binary blend of PAO-4 (the reference oil) and another base stock such that the blend has a CCSV at −35° C. higher than that of PAO-4 base stock, one can simply choose a PAO base stock with a higher KV100. However, this also causes an increase in KV100 for the blend relative to PAO-4. Typical Group IV base stocks with low viscosity (e.g., PAO-8 and PAO-10) or with a high viscosity (e.g., PAO-40 and PAO-100) all demonstrate poor CCSV-boosting efficacy and are not suitable CCSV-boosting base stocks. When blended with PAO-4 as the reference oil, they all resulted in D(ccsv)>0, which is desirable, D(kv)>0, which is undesirable, and a ratio of D(ccsv)/D(kv)<4.0, which renders them unsuitable as CCSV-boosting base stocks with respect to PAO-4 as the reference oil.

A mixture oil consisting of 10 wt % of the PAO-8 base stock and 90 wt % of the PAO-4 reference oil was measured for viscosity and run through DSC scan using identical instruments under identical measurement conditions to those for the neat PAO-4 reference oil, described above. The viscosity-temperature diagram at three shear rates (0.1, 10 and 100 s$^{-1}$, respectively) and the DSC curve are provided in FIGS. 12a and 12b, respectively.

Figure 12A:
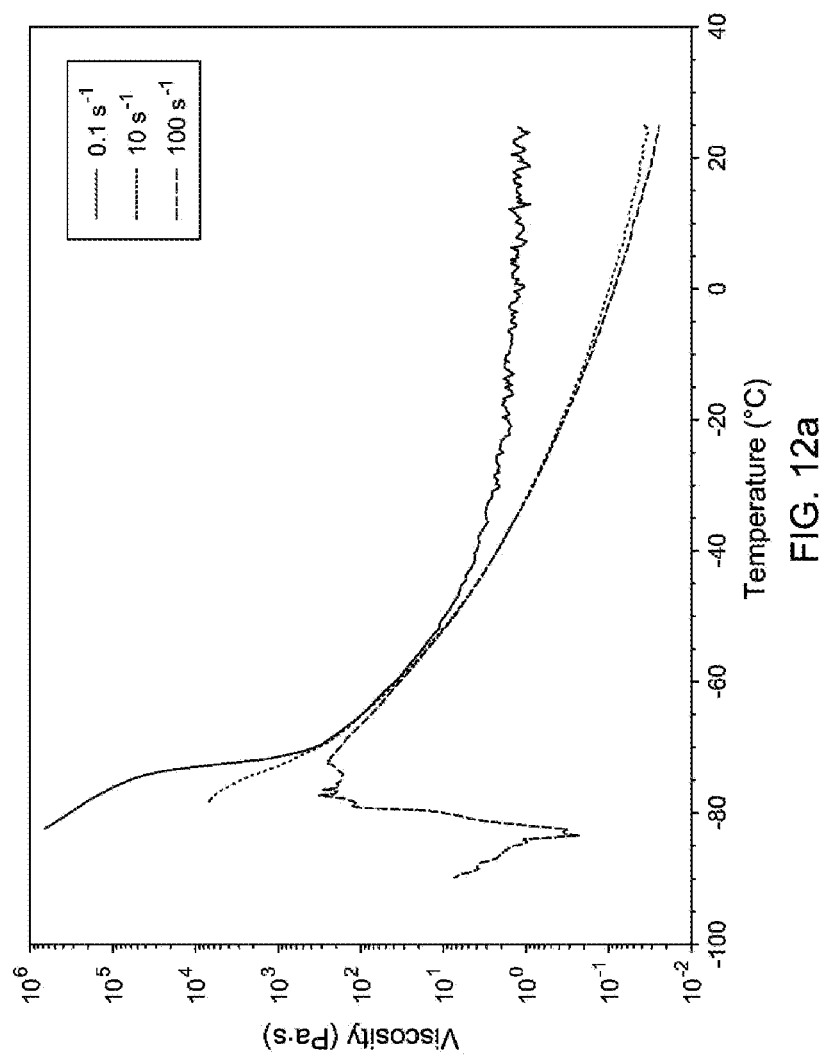
FIGS. 12a and 12b are a diagram showing viscosity as a function of temperature at various shear rates of a mixture oil consisting of the PAO-4 reference oil of FIGS. 8a and 8b and a cPAO base stock having a KV100 of about 8 cSt, and a DSC curve of the mixture oil, respectively.

As can be clearly seen from FIG. 12a, in all three viscosity-temperature curves, the mixture oil did not demonstrate a very steep viscosity increase when temperature decreased from 20° C. to −40° C. At 10 and 100 s$^{-1}$, viscosity of the mixture oil increased very smoothly along almost the same curve in this temperature range. At 0.1 s$^{-1}$, measured viscosity only oscillated within a very small range (less than 0.5 order of magnitude).

Figure 12B:
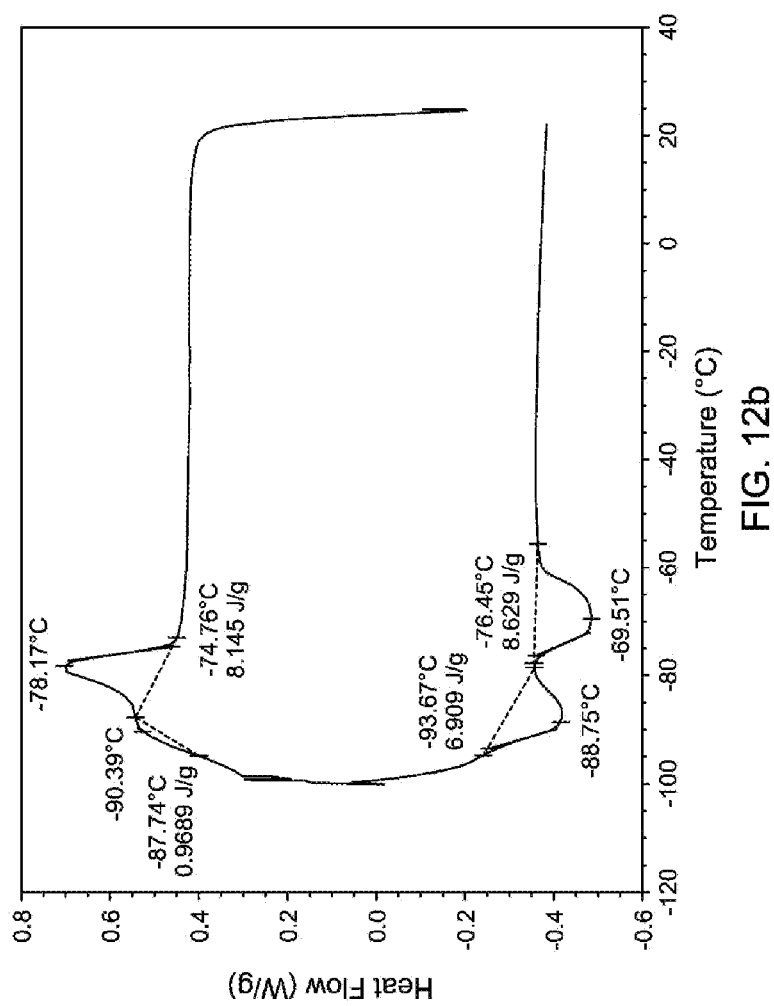

As can be seen from FIG. 12b, in the DSC curve, no peak was recorded in the temperature range from 20° C. to −40° C. FIGS. 12a and 12b taken together suggest that no phase separation occur when the mixture oil is cooled from 20° C. to −40° C.

A comparison of FIG. 8a against FIG. 12a show a lot of similarities at shear rates of 10 and 100 s$^{-1}$ in the decreasing temperature zone from 25° C. to −45° C. Viscosity of neat PAO-4 and the mixture oil of PAO-4/PAO-8 increased gradually and smoothly with no dramatic increase at all. The difference of the curves at low shear rate of 0.1 s$^{-1}$ is likely attributable to the capability of the measurement machine. A comparison of FIG. 8b against FIG. 12b also show a lot of similarities in the temperature range from 25° C. to −45° C. These indicate that the neat PAO-4 and the PAO-4/PAO-8 mixture oil behave quite similarly from a viscosity-temperature relationship perspective.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. An oil composition comprising a first base stock and a reference oil different from the first base stock, wherein the reference oil is the remainder of the oil composition absent the first base stock;
   wherein the first base stock is selected from one or more of:
   a C28-C40 mono-methyl paraffin,
   a linear mono-ester having the following formula $R^1$—C(O)—O—$R^2$, where $R^1$ and $R^2$ are independently each a linear, non-branched hydrocarbyl group, $R^1$ comprises from 15-17 carbon atoms and $R^2$ comprises from 10-12 carbon atoms, and
   the oil composition exhibiting a viscosity measured at 0.1 s$^{-1}$ shear rate at a temperature T1° C. of v1(T1) Pa·s, a viscosity measured at 0.1 s$^{-1}$ shear rate at a temperature T2° C. of v1(T2) Pa·s, where −35≤T1≤25, 0<T1−T2≤10, and v1(T2)/v1(T1)≥50; and
   further exhibiting a peak in the vicinity of the temperature T1−5° C. on the DSC curve thereof in the temperature range from −60° C. to 25° C. when the oil composition is being cooled down.

2. The oil composition of claim 1, wherein v1(T2)/v1(T1)≥100.

3. The oil composition of claim 1, wherein 0<T1−T2≤8.

4. The oil composition of claim 1, wherein the oil composition exhibits a viscosity measured at 10 s$^{-1}$ shear rate at T1° C. of v2(T1) Pa·s, a viscosity measured at 10 s$^{-1}$ shear rate at the temperature T2° C. of v2(T2) Pa·s, where T1 and T2 are the same numbers as in claim 1, and v2(T2)/v2(T1)≥10.

5. The oil composition of claim 3, wherein v2(T2)/v2(T1)≥5.

6. The oil composition of claim 3, wherein (v1(T2)/v1(T1))/(v2(T2)/v2(T1))≥5.

7. The oil composition of claim 1, wherein the oil composition exhibits a viscosity measured at 100 s$^{-1}$ shear rate at T1° C. of v3(T1) Pa·s, a viscosity measured at 100 s$^{-1}$ shear rate at T2° C. of v3(T2) Pa·s, where T1 and T2 are the same numbers as in claim 1, and v3(T2)/v3(T1)≥5.

8. The oil composition of claim 7, wherein v3(T2)/v3(T1)≥2.

9. The oil composition of claim 7, wherein ((v2(T2)/v2(T1))/(v3(T2)/v3(T1))≥2.

10. The oil composition of claim 1, wherein the reference oil comprises an API Group III base stock, an API Group IV base stock, or a mixture thereof.

11. The oil composition of claim 1, wherein the reference oil is an API Group III base stock, an API Group IV base stock, or a mixture thereof.

12. The oil composition of claim 1, wherein the reference oil is a AGI Group IV base stock having a kinematic viscosity at 100° C. as determined pursuant to ASTM D445 ("KV100") in the range from 3.0 to 10.0 cSt.

13. The oil composition of claim 1, wherein the first base stock is present at a concentration in the range from about 1 to 50 wt %, based on the total weight of the oil composition.

14. The oil composition of claim 1, wherein the first base stock is present at a concentration in the range from about 5 to 15 wt %, based on the total weight of the oil composition.

15. The oil composition of claim 1, wherein the first base stock undergoes a phase change in the oil composition at a temperature in the vicinity of T1-5° C.

16. The oil composition of claim 1, which is an engine oil formulation.

17. The oil composition of claim 16, which has a KV100 and CCSV meeting the requirements of a grade defined by SAE J300.

18. A mixture oil comprising a lubricating oil base stock and a reference oil, wherein the reference oil is the remainder of the mixture oil absent the lubricating oil base stock; wherein the lubricating oil base stock is selected from one or more of:
   a C28-C40 mono-methyl paraffin; and
   a linear mono-ester having the following formula $R^1$—C(O)—O—$R^2$, where $R^1$ and $R^2$ are independently each a linear, non-branched hydrocarbyl group, $R^1$ comprises from 15-17 carbon atoms and $R^2$ comprises from 10-12 carbon atoms, and
   the lubricating oil base stock has a KV100 in the range from 3.0 to 12.0 cSt, a Noack volatility as determined by ASTM D5800 of no higher than 20%, and when blended with the reference oil which is a Group IV base stock having a KV100 of 4.0 cSt to form the mixture oil comprising the lubricating oil base stock at a concentration of 10 wt %, based on the total weight of the mixture oil, the mixture oil exhibits at least one of the following (i) and (ii):
   (i) a viscosity measured at 0.1 s$^{-1}$ shear rate at a temperature T1° C. of v(T1) Pa·s, a viscosity measured at 0.1 s$^{-1}$ shear rate at the temperature T2° C. of v(T2) Pa·s, where −35≤T1≤25, 0<T1−T2≤10, v1(T2)/v1(T1)≥50; and
   (ii) a peak in the vicinity of the temperature of T1-5° C. on the DSC curve thereof in the temperature range from −60° C. to 25° C. when the mixture oil is being cooled down.

19. The mixture oil of claim 18, wherein the mixture oil further exhibits a viscosity measured at 10 s$^{-1}$ shear rate at T1° C. of v2(T1) Pa·s, a viscosity measured at 10 s$^{-1}$ shear rate at the temperature T2° C. of v2(T2) Pa·s, where T1 and T2 are the same numbers as in claim 18, and v2(T2)/v2(T1)≥10.

20. The mixture oil of claim 19, wherein (v1(T2)/v1(T1))/(v2(T2)/v2(T1))≥5.

21. The mixture oil of claim 18, wherein the mixture oil exhibits a viscosity measured at 100 s$^{-1}$ shear rate at T1° C. of v3(T1) Pa·s, a viscosity measured at 100 s$^{-1}$ shear rate at T2° C. of v3(T2) Pa·s, where T1 and T2 are the same numbers as in claim 18, and v3(T2)/v3(T1)≥2.

22. The mixture oil of claim 21, wherein ((v2(T2)/v2(T1))/(v3(T2)/v3(T1))≥2.

23. The mixture oil of claim 18, wherein 0<T1−T2≤8.

24. A mixture oil comprising a lubricating oil base stock and a reference oil, wherein the reference oil is the remainder of the mixture oil absent the lubricating oil base stock; wherein the lubricating oil base stock is selected from one or more of:
   a C28-C40 mono-methyl paraffin; and
   a linear mono-ester having the following formula $R^1$—C(O)—O—$R^2$, where $R^1$ and $R^2$ are independently each a linear, non-branched hydrocarbyl group, $R^1$ comprises from 15-17 carbon atoms and $R^2$ comprises from 10-12 carbon atoms, and
   the lubricating oil base stock has a KV100 in the range from 3.0 to 12.0 cSt, a Noack volatility as determined by ASTM D5800 of no higher than 20;
   when blended with the reference oil which is a Group IV base stock having a KV100 of 4.0 cSt to form the mixture oil comprising the lubricating oil base stock at a concentration of 10 wt %, based on the total weight of the mixture oil, the mixture oil exhibits at least one of the following (i) and (ii):
   (i) a viscosity measured at 0.1 s$^{-1}$ shear rate at a temperature T1° C. of v(T1) Pa·s, a viscosity measured at 0.1 s$^{-1}$ shear rate at the temperature T2° C. of v(T2) Pa·s, where −35≤T1≤25, 0<T1−T2≤10, v1(T2)/v1(T1)≥50; and
   (ii) a peak in the vicinity of the temperature of T1-5° C. on the DSC curve thereof in the temperature range from −60° C. to 25° C. when the mixture oil is being cooled down.

* * * * *